US012397691B2

(12) United States Patent
Kucera et al.

(10) Patent No.: US 12,397,691 B2
(45) Date of Patent: Aug. 26, 2025

(54) OUTDOOR POWER EQUIPMENT WITH CONVERTER SEATED AND STANDING OPERATOR POSITIONS

(71) Applicant: MTD PRODUCTS INC, Valley City, OH (US)

(72) Inventors: Jeff Kucera, Medina, OH (US); Cory Bringhurst, Valley City, OH (US); Jeremy Powell, Olmsted Township, OH (US); Seth Misenko, Valley City, OH (US); Robert Davis, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 341 days.

(21) Appl. No.: 17/693,727

(22) Filed: Mar. 14, 2022

(65) Prior Publication Data
US 2022/0379781 A1    Dec. 1, 2022

Related U.S. Application Data

(60) Provisional application No. 63/213,646, filed on Jun. 22, 2021, provisional application No. 63/160,524, filed on Mar. 12, 2021.

(51) Int. Cl.
*B60N 2/38* (2006.01)
*A01D 34/64* (2006.01)
(Continued)

(52) U.S. Cl.
CPC ............... *B60N 2/38* (2013.01); *A01D 34/64* (2013.01); *A01D 34/824* (2013.01); *A01D 67/04* (2013.01);
(Continued)

(58) Field of Classification Search
CPC .... B60N 2002/247; B60N 2/20; B60N 2/203; A61G 5/14; B60R 21/131; A01D 67/04; A01D 2101/00
See application file for complete search history.

(56) References Cited

U.S. PATENT DOCUMENTS

| 2,740,462 A | | 4/1956 | Stegeman | |
|---|---|---|---|---|
| 3,279,850 A | * | 10/1966 | Buhler | ................... B60N 2/305 297/335 |

(Continued)

FOREIGN PATENT DOCUMENTS

| CN | 211364835 U | 8/2020 |
|---|---|---|
| EP | 1197399 A2 | 4/2002 |

(Continued)

OTHER PUBLICATIONS

International Search Report & Written Opinion for Application No. PCT/US2022/020127, dated Aug. 11, 2022, 19 pages.

*Primary Examiner* — Emma K Frick
(74) *Attorney, Agent, or Firm* — Wegman Hessler Valore

(57) ABSTRACT

An outdoor power equipment having sitting configuration and standing configuration is presented herein. The outdoor power equipment can be transformed from the sitting configuration to the standing configuration and vice versa, allowing an operator to use the outdoor power equipment in either a sitting position or standing position. The sitting position can place the operator at least in part forward of a drive axis of the outdoor power equipment, whereas the standing position can place the operator at least in part coincident with or behind the drive axis. The outdoor power equipment can be electric powered in some aspects, with modular and replaceable battery packs.

11 Claims, 31 Drawing Sheets

(51) Int. Cl.
*A01D 34/82* (2006.01)
*A01D 67/04* (2006.01)
*A01D 75/18* (2006.01)
*A01D 101/00* (2006.01)
*B60N 2/20* (2006.01)
*B60R 21/13* (2006.01)

(52) U.S. Cl.
CPC .............. *A01D 75/18* (2013.01); *B60N 2/20* (2013.01); *B60R 21/131* (2013.01); *A01D 2101/00* (2013.01)

(56) References Cited

U.S. PATENT DOCUMENTS

| | | | |
|---|---|---|---|
| 3,336,042 | A | 8/1967 | Southall |
| 3,583,518 | A | 6/1971 | Bichel et al. |
| 3,797,213 | A | 3/1974 | Sadow, Jr et al. |
| 4,198,092 | A | 4/1980 | Federspiel |
| 4,514,967 | A | 5/1985 | Scanland et al. |
| 4,532,725 | A | 8/1985 | Trejo et al. |
| 4,750,319 | A | 6/1988 | Aldred |
| 4,878,339 | A | 11/1989 | Marier et al. |
| 5,065,967 | A * | 11/1991 | Murakami .............. E02F 3/325 248/161 |
| 5,118,123 | A | 6/1992 | Betrock |
| 5,181,370 | A | 1/1993 | Simone |
| 5,238,267 | A | 8/1993 | Hutchinson et al. |
| 5,239,810 | A | 8/1993 | Gugel |
| 5,307,612 | A * | 5/1994 | Tomiyama ........... A01D 34/824 56/11.1 |
| 5,337,543 | A * | 8/1994 | Kitamura ............... A01D 34/68 56/10.8 |
| 5,355,661 | A | 10/1994 | Tomiyama |
| 5,388,850 | A | 2/1995 | Simone |
| 5,463,853 | A | 11/1995 | Santoli et al. |
| 5,517,809 | A * | 5/1996 | Rich ................... A01D 34/6806 56/2 |
| 5,575,140 | A | 11/1996 | Bermes et al. |
| 5,653,466 | A | 8/1997 | Berrios |
| 5,809,755 | A | 9/1998 | Velke et al. |
| 5,809,756 | A | 9/1998 | Scag et al. |
| 5,913,802 | A | 6/1999 | Mullet et al. |
| 5,984,031 | A | 11/1999 | Velke et al. |
| 6,189,964 | B1 | 2/2001 | Henshaw et al. |
| 6,205,753 | B1 * | 3/2001 | Velke ................. A01D 34/6806 56/14.7 |
| 6,490,849 | B1 | 12/2002 | Scag et al. |
| 6,497,422 | B1 | 12/2002 | Bellis, Jr. |
| 6,845,829 | B2 | 1/2005 | Hafendorfer |
| 7,047,716 | B2 * | 5/2006 | Lang .................... A01D 34/001 56/16.7 |
| 7,059,109 | B2 | 6/2006 | Samejima et al. |
| 7,146,787 | B2 | 12/2006 | Walker |
| 7,231,755 | B2 | 6/2007 | Clarke |
| 7,325,388 | B2 | 2/2008 | Wright et al. |
| 7,467,677 | B2 | 12/2008 | Barrier |
| 7,866,426 | B2 | 1/2011 | Umemoto et al. |
| 7,882,914 | B2 * | 2/2011 | Scheele ................. A01D 34/82 280/89.12 |
| 7,942,224 | B2 | 5/2011 | Marshall et al. |
| 8,091,672 | B2 | 1/2012 | Gutsch et al. |
| 8,096,374 | B1 | 1/2012 | Papke et al. |
| 8,245,806 | B2 | 8/2012 | Newell |
| 8,262,104 | B2 | 9/2012 | Kallevig et al. |
| 8,523,231 | B2 | 9/2013 | Tada et al. |
| 8,561,382 | B2 | 10/2013 | Gamble et al. |
| 9,173,346 | B2 | 11/2015 | Koike et al. |
| 9,205,879 | B2 | 12/2015 | Ephraim |
| 9,433,147 | B2 | 9/2016 | Schmalz |
| 9,499,199 | B1 | 11/2016 | Laymon et al. |
| 9,511,735 | B2 * | 12/2016 | Schlup, Jr. ............. B60R 21/13 |
| 9,693,504 | B2 | 7/2017 | Slegelis et al. |
| 9,821,689 | B2 | 11/2017 | Busboom et al. |
| 9,999,177 | B2 | 6/2018 | Hoppel |
| 10,036,303 | B2 | 7/2018 | Shiraga et al. |
| 10,058,030 | B2 | 8/2018 | Hoppel |
| 10,112,645 | B2 | 10/2018 | Ito et al. |
| 10,130,037 | B2 | 11/2018 | Conrad et al. |
| 10,194,586 | B2 | 2/2019 | Hoppel |
| 10,358,017 | B1 * | 7/2019 | Harris .................... A01D 34/81 |
| 10,562,479 | B2 | 2/2020 | Bartel et al. |
| 10,588,256 | B2 * | 3/2020 | Baena .................... B60N 3/06 |
| 10,687,464 | B2 | 6/2020 | Zeller et al. |
| 10,743,468 | B2 | 8/2020 | Hoppel |
| 10,986,782 | B2 | 4/2021 | Fisher et al. |
| 11,285,059 | B1 * | 3/2022 | Alexander ............... A61G 5/14 |
| 11,724,658 | B2 * | 8/2023 | Bartel .................... A01D 75/20 280/756 |
| 12,053,794 | B2 * | 8/2024 | Reeves ................ B62D 51/02 |
| 12,187,358 | B2 * | 1/2025 | Ono ...................... A01D 67/04 |
| 2003/0221402 | A1 * | 12/2003 | Velke ................. A01D 34/6806 56/17.5 |
| 2007/0290493 | A1 | 12/2007 | David |
| 2018/0022624 | A1 | 1/2018 | Ito et al. |
| 2019/0075726 | A1 | 3/2019 | White et al. |
| 2019/0166758 | A1 | 6/2019 | Phillip et al. |
| 2020/0022303 | A1 | 1/2020 | Gindt et al. |
| 2020/0113133 | A1 | 4/2020 | Zeller et al. |
| 2020/0205338 | A1 | 7/2020 | Zeiler et al. |
| 2020/0207300 | A1 | 7/2020 | Tada |
| 2020/0390031 | A1 | 12/2020 | Yang et al. |
| 2021/0009182 | A1 | 1/2021 | Ten Haaft et al. |
| 2021/0076565 | A1 | 3/2021 | Laine et al. |
| 2021/0084821 | A1 | 3/2021 | Wu et al. |
| 2024/0025367 | A1 * | 1/2024 | Wershing ................ B60R 21/13 |

FOREIGN PATENT DOCUMENTS

| | | |
|---|---|---|
| EP | 2356897 B1 | 11/2012 |
| EP | 1973395 B1 | 2/2018 |
| EP | 3461694 B1 | 5/2020 |
| GB | 200581 A | 4/1922 |
| JP | H0595703 A | 4/1990 |
| JP | H05284834 A | 11/1993 |
| JP | H06239180 A | 8/1994 |
| JP | 2005192529 A | 7/2005 |
| JP | 4126549 B2 | 7/2008 |
| JP | 2012130257 A | 7/2012 |
| JP | 2014015074 A | 1/2014 |
| WO | 2017/173945 A1 | 10/2017 |
| WO | 2021/071655 A1 | 4/2021 |

* cited by examiner

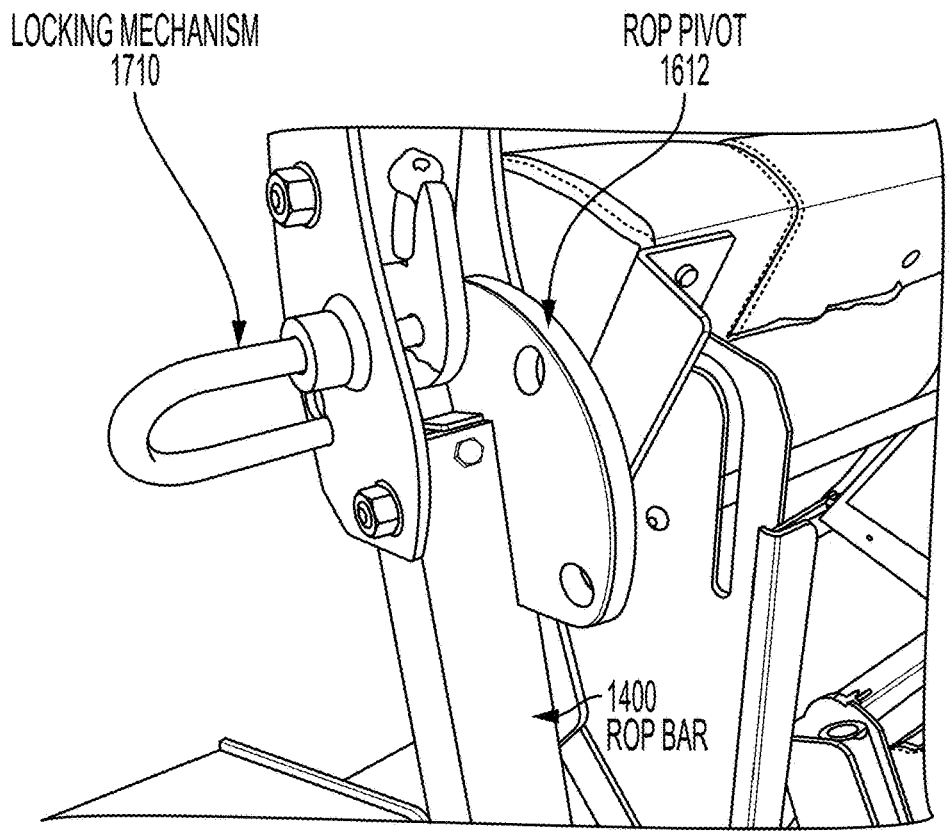
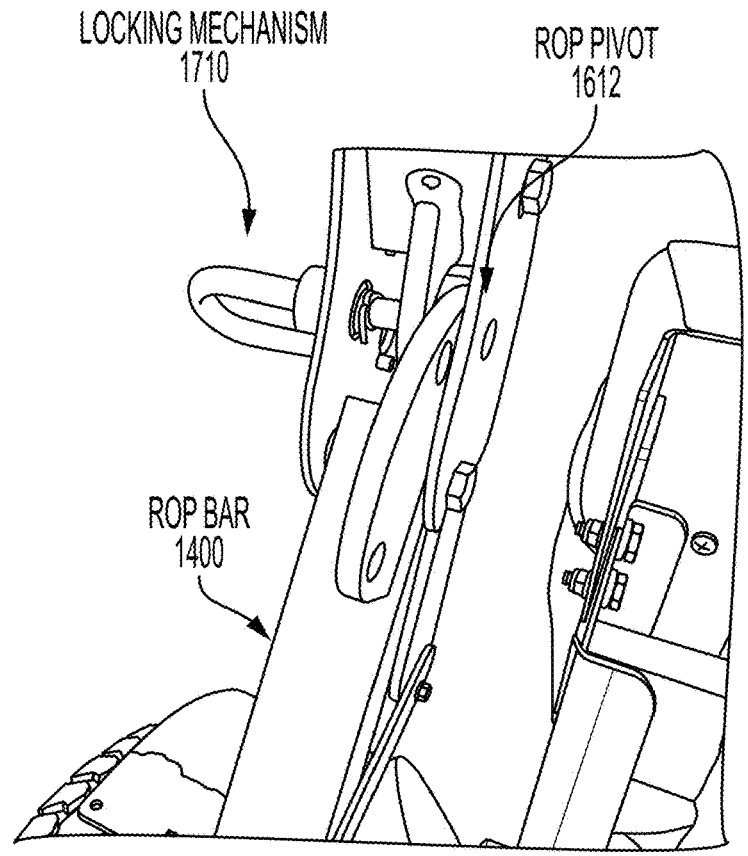
FIG. 17

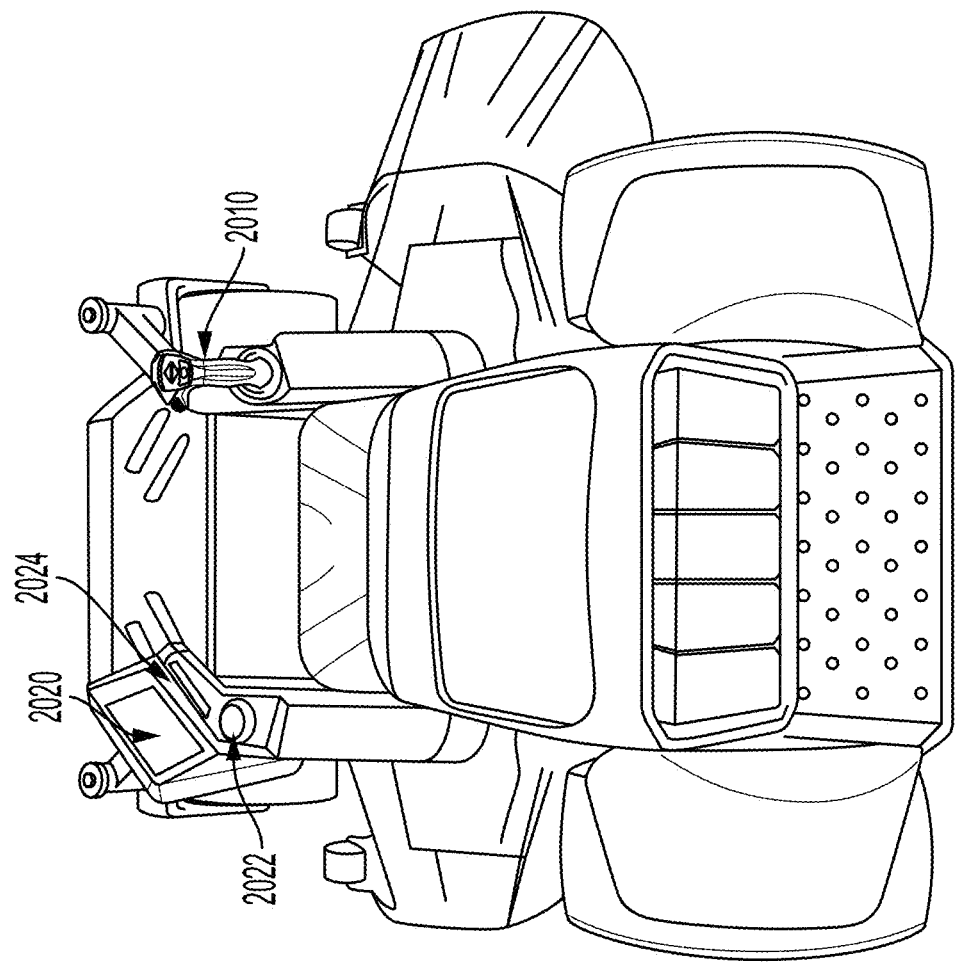
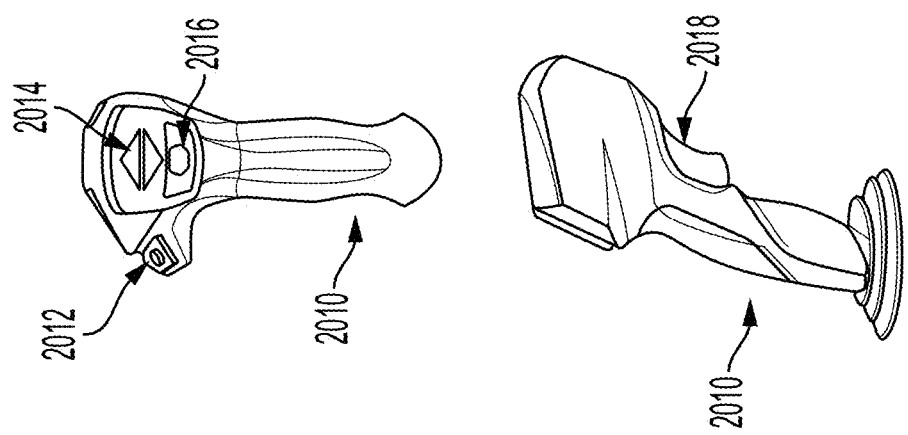
FIG. 20

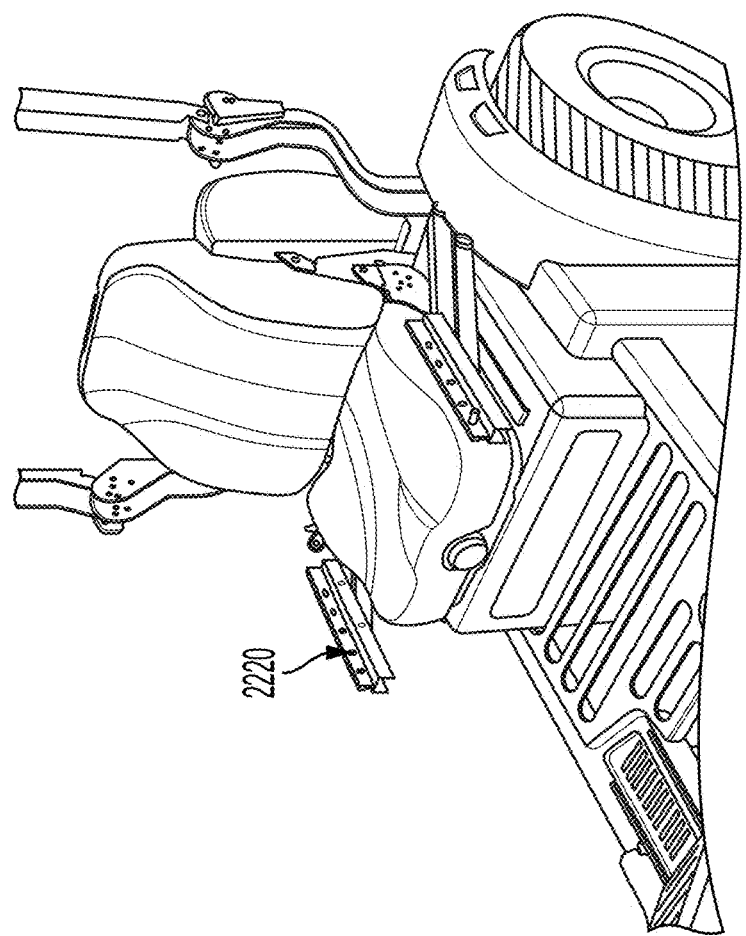
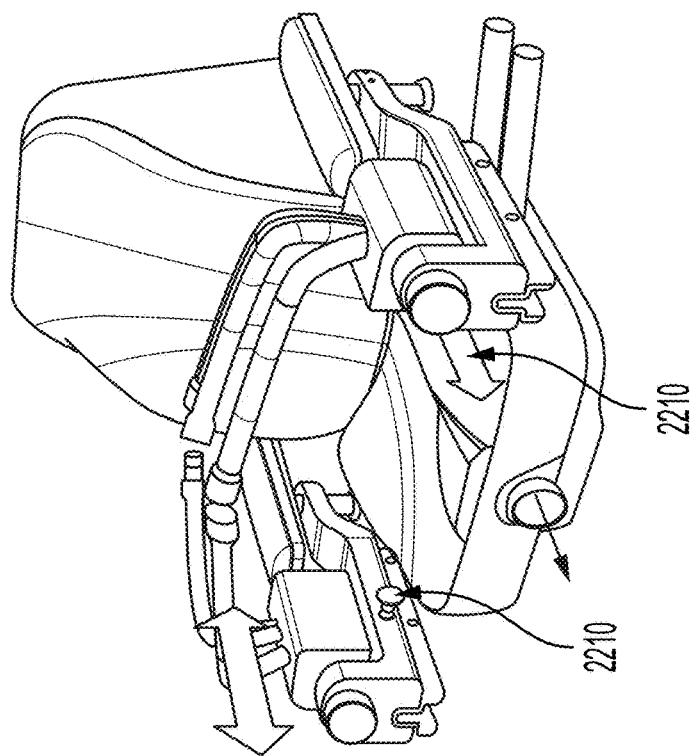
FIG. 22

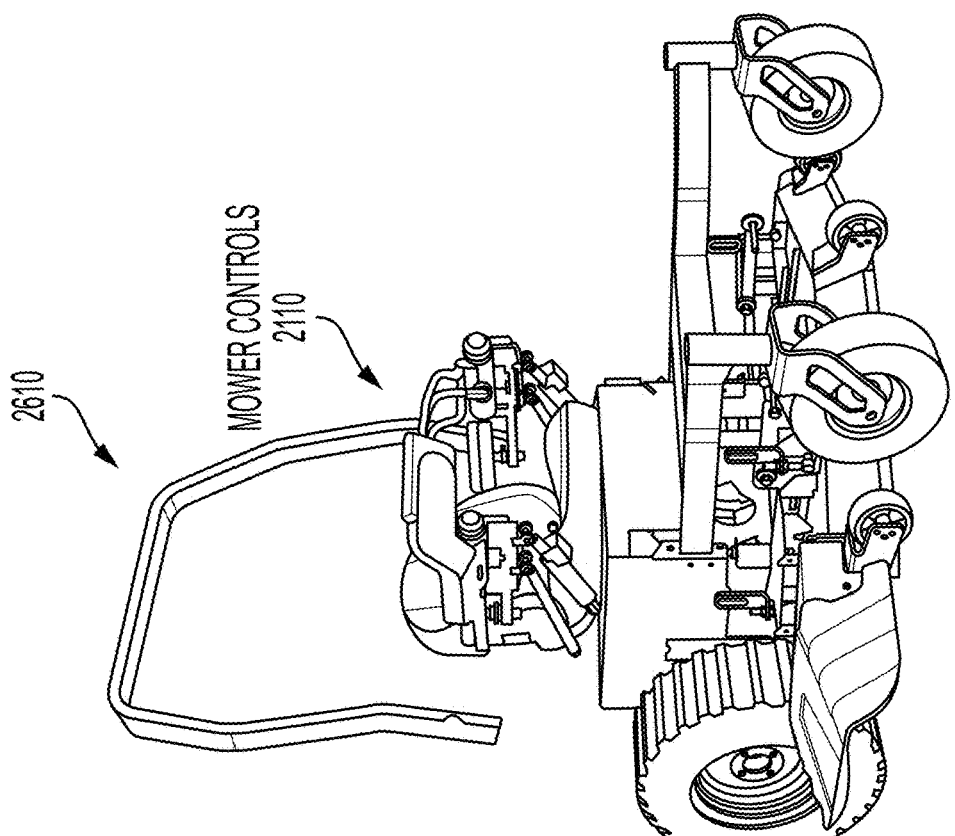
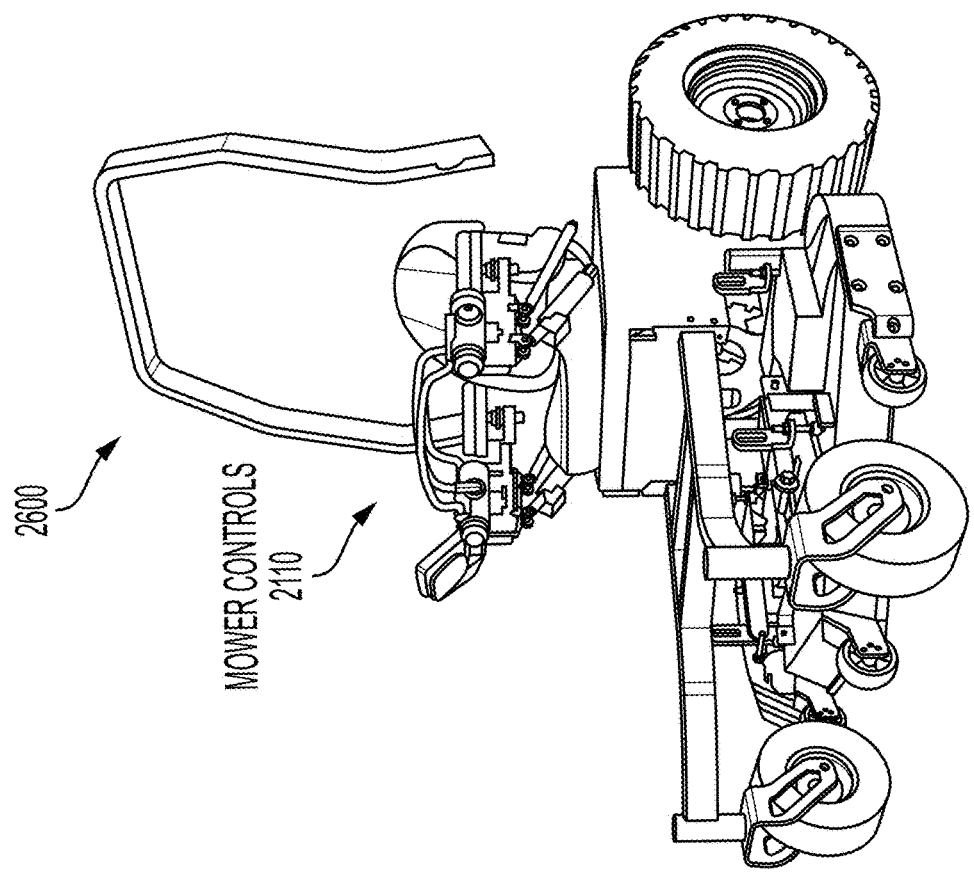
FIG. 26

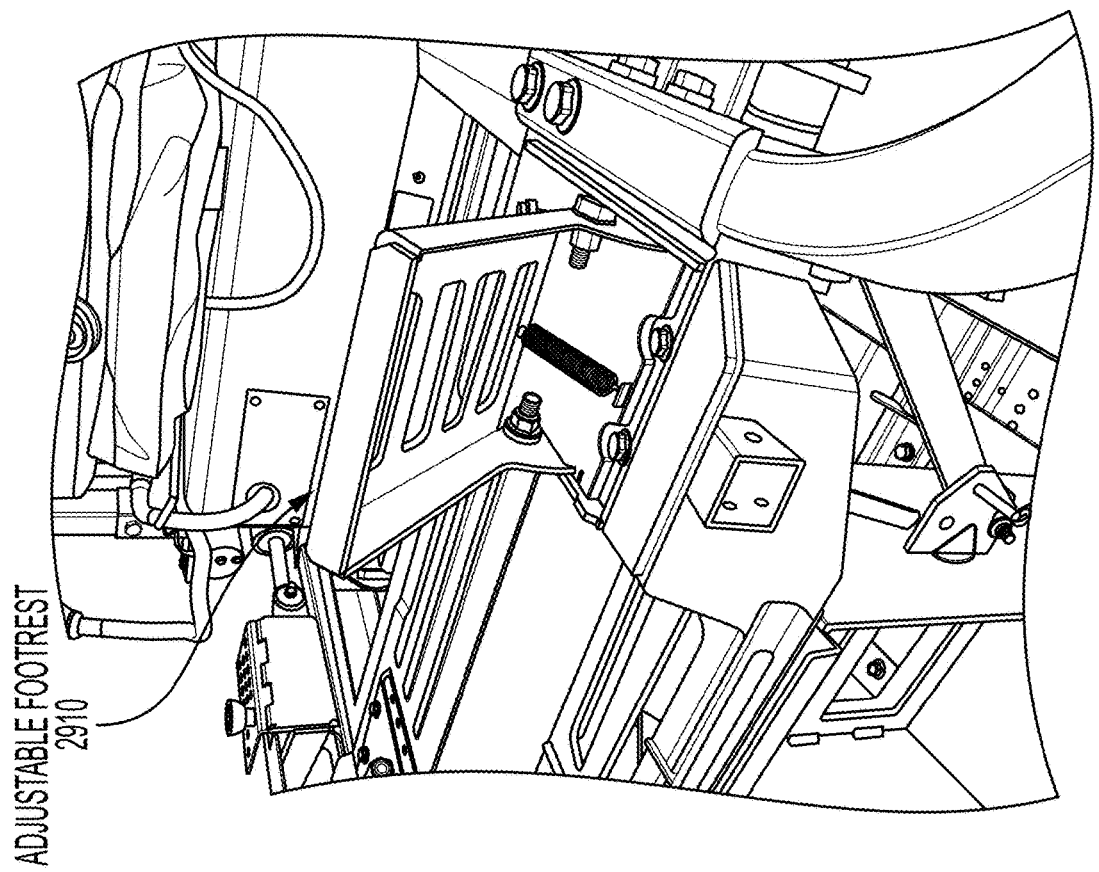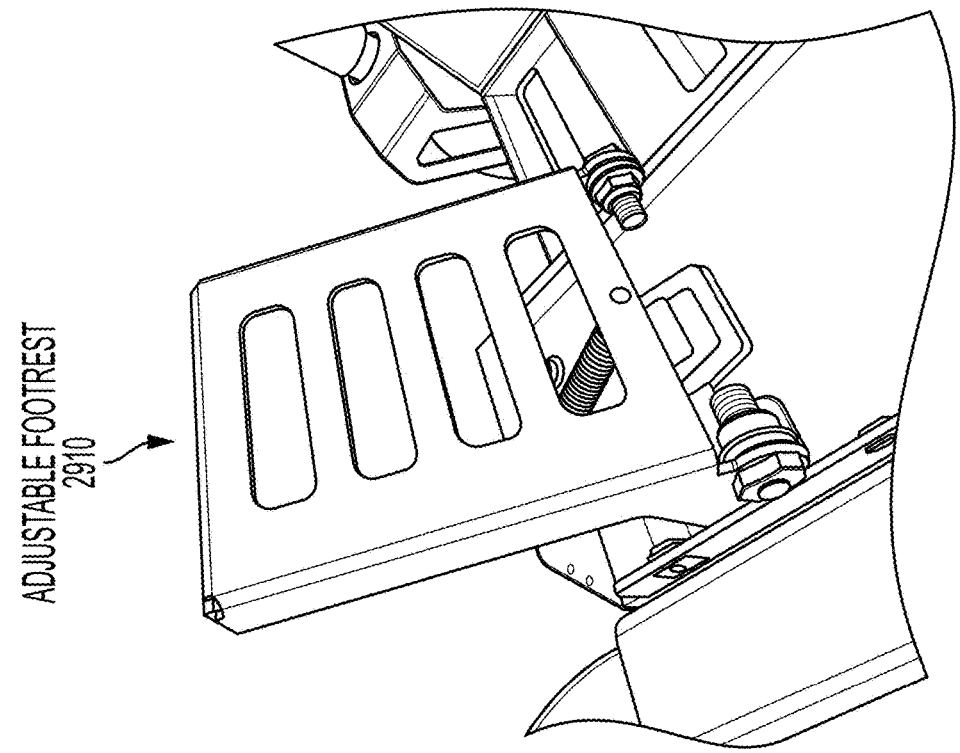
FIG. 29

OUTDOOR POWER EQUIPMENT WITH CONVERTER SEATED AND STANDING OPERATOR POSITIONS

CROSS REFERENCE TO RELATED APPLICATIONS

This application claims the benefit of U.S. Provisional Application No. 63/160,524 filed Mar. 12, 2021 and U.S. Provisional Application No. 63/213,646 filed Jun. 22, 2021, the entireties of which are hereby incorporated by reference. The following are hereby incorporated by reference within the present disclosure in their respective entireties and for all purposes: U.S. patent application Ser. No. 16/782,409 filed Feb. 5, 2020, U.S. Provisional Application No. 62/907,992 filed Sep. 30, 2019, U.S. Provisional Application No. 62/801,202 filed Feb. 5, 2019, U.S. Provisional Application No. 63/160,524 filed Mar. 12, 2021, and U.S. Provisional Application No. 63/213,646 filed Jun. 22, 2021.

FIELD OF DISCLOSURE

The disclosed subject matter pertains to apparatuses and methods for outdoor power equipment (e.g., lawn maintenance devices, etc.), for instance, having one or more features discussed herein, such as the ability to convert between seated and standing operator positions, a removable battery system, or other features discussed herein.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Power equipment can vary in terms of available operator positions. Some power equipment have a standing and/or walking operator positions adjacent to the power equipment (e.g., push mowers or tillers, etc.), while other power equipment have a riding operator positions on the power equipment, such as a seated operating position (e.g., riding mowers, etc.) or a standing operator position (e.g., standing mowers, etc.).

Modern maintenance machines also offer multiple options for power source. The various advantages associated with electric motor engines, gasoline engines, natural gas engines, diesel engines and so forth also impact the mechanical design and engineering that go into these different maintenance devices. Meeting the various challenges associated with different maintenance and mowing applications and the benefits and limitations of different power sources results in a large variety of maintenance machines to meet consumer preferences.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Various embodiments of the present disclosure an outdoor power equipment having a convertible sitting and standing ride-on configurations, a removable battery system, and/or other features discussed herein. One example embodiment is an outdoor power equipment, comprising: a frame; a plurality of drive wheels rotatable about a drive wheel rotation axis; a rollover protection (ROP) bar secured to the frame; an operator seat secured to the frame; a cushion configured to be in one or more of a first position associated with a sitting configuration of the outdoor power equipment or a second position associated with a standing configuration of the outdoor power equipment; drive controls for operator-initiated drive and steering functions of the outdoor power equipment; and a standing platform positioned at least in part rearward of the operator seat, wherein at least two of the ROP bar, the cushion, or the drive controls are configured to move together between the sitting configuration and the standing configuration of the outdoor power equipment.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIG. 17 illustrates a pair of images showing a locking mechanism that can secure a ROP bar in an upright position for seated operation, in connection with the second example embodiment.

FIG. 20 illustrates images of an example joystick-based control configuration for an outdoor power equipment, in connection with various aspects discussed herein.

FIG. 22 illustrates two images showing a mechanism that allows for adjustment of the position of the control pods that house lap bars, in connection with various aspects discussed herein.

FIG. 26 illustrates left and right perspective views and of an outdoor power equipment with lap bar controls, in connection with various aspects discussed herein.

FIG. 29 illustrates a pair of images showing an example adjustable footrest that can be employed on an outdoor power equipment, in connection with various aspects discussed herein.

Figure 1:
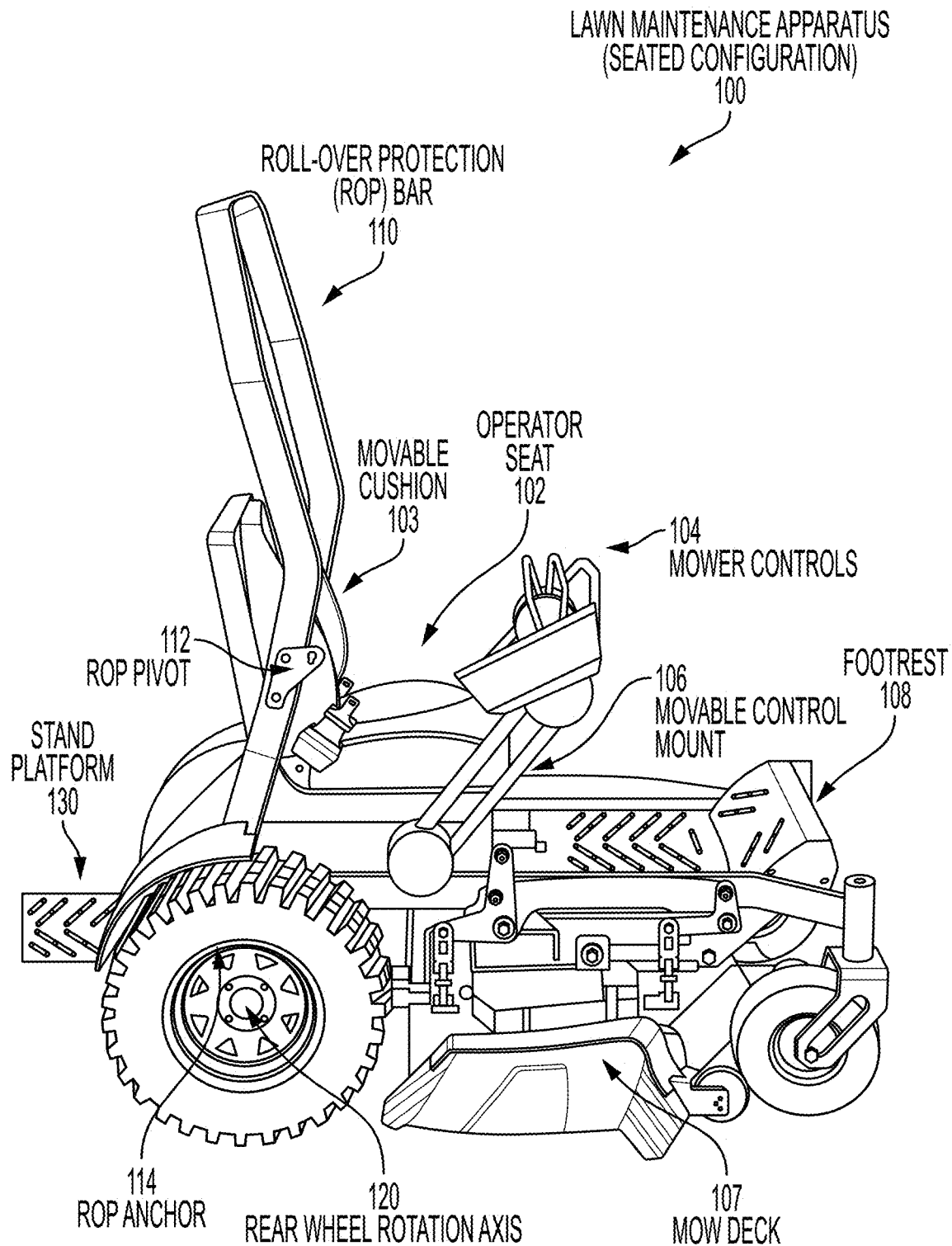
FIG. 1 provides an illustration of a convertible lawn maintenance apparatus in a seated configuration, according to disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

FIG. 1 illustrates a drawing of a first example lawn maintenance apparatus 100 according to various embodiments of the present disclosure. Although example lawn maintenance apparatuses (e.g., lawn maintenance apparatus 100) are provided for the purpose of illustrating various aspects discussed herein, various embodiments can be or can be employed within or in connection with other outdoor power equipment (e.g., snow thrower(s), etc.) Lawn maintenance apparatus 100 can be a convertible standing/sitting lawn maintenance apparatus, in various embodiments. As illustrated in FIG. 1, lawn maintenance apparatus 100 is in a seated configuration, allowing an operator to ride in a seated position on an operator seat 102 with mower controls 104 for controlling powered operations of lawn maintenance apparatus 100 (e.g., drive functions, steering functions, and so forth, whether mechanical, electro-mechanical, hydraulic, pneumatic, or other suitable means of power operation), as well as electronic control or computer functions of lawn maintenance apparatus 100 (e.g., stored electronic settings, Global Positioning System (GPS) navigation, operator input controls/output indicators, status input controls/output indicators, and so forth). A mow deck 107 is provided beneath a support structure (e.g., frame, etc.) of lawn maintenance apparatus 100, and in the embodiment depicted by FIG. 1, between the front and rear wheels thereof (see FIGS. 10 and 11 in contrast).

In various embodiments, lawn maintenance apparatus 100 can include a roll over protection (ROP) bar 110 with a ROP anchor point 114 near to a rear wheel rotation axis 120 of lawn maintenance apparatus 100. In one or more embodiments, ROP anchor point 114 can be within about 6 inches or less of rear wheel rotation axis 120 (see also FIG. 7, discussed below). A footrest 108 is also provided for operator comfort (see FIG. 9, discussed below).

According to disclosed embodiments, lawn maintenance apparatus 100 can be mechanically changed to a standing configuration. A stand platform 130 is provided for an operator to stand upon while riding lawn maintenance apparatus 100 in a standing position (see FIG. 3, discussed below). In a seated position, movable cushion 103 can be in a first position (for seated operation, e.g., as shown in FIGS. 1, 4, 5A, and 10 for a first embodiment, and FIGS. 13 (top left), 14 (top), 15 (top), and 18 for a first embodiment, etc.) whereby it can act as a movable cushion for a seated operator. In various embodiments, one or more of: mower controls 104, operator seat 102, movable cushion 103 and ROP bar 110 can be movable to change from the seated configuration to the standing configuration, and back again. As an example, mower controls 104 can be provided on a movable control mount 106 that can move mower controls 104 between a seated operator hand position (as illustrated in FIG. 1; see also FIG. 4 at reference numerals 104 and 404, etc.) and a standing operator hand position (see FIG. 3, at reference numbers 204 and 304). As another example, movable cushion 103 can slide, pivot, rotate, or the like to a second position (for standing operation, e.g., as shown in FIGS. 2, 3, 5C, 7, and 8 for a first embodiment, and in FIGS. 13 (bottom right), 14 (bottom), 15 (bottom), 16, and 17 for a second embodiment, etc.) allowing an operator standing on stand platform 130 to lean against a portion (e.g., back or front, with the same or an inverted orientation relative to the first position, etc.) of movable cushion 103 (see FIG. 2, reference number 203).

In the same or other embodiments, operator seat 102 can slide, pivot, etc., to accommodate an operator standing on stand platform 130. As still another example, ROP bar 110 can fold downward away from an elevated position (as depicted by FIG. 1) by way of a ROP pivot 112. In further embodiments, any suitable combination of the foregoing can be movable parts to accommodate comfortable operator position in the seated configuration versus the standing configuration. Moreover, seated configuration and standing configuration can be selected to place the operator's head and hips at or near rear wheel rotation axis 120 to minimize centrifugal force experienced by the operator when conducting a turn of lawn maintenance apparatus 100 (e.g., see FIGS. 3 and 4, discussed below). This head and hip position can significantly reduce unpleasant user experience resulting from tight turns, or even zero radius turns, implemented about an axis intersecting rear wheel rotation axis 120.

In still further embodiments, means for moving one or more of the movable parts (ROP bar 110, movable cushion 103, seat 102, mower controls 104, footrest 108, etc.) can be integrated into a common or linked motion so that movement of a plurality of the foregoing movable parts can be implemented by activating a single motion initiator. The motion initiator can be by mechanical (e.g., gears, pulleys, levers, pedals, bars, etc.), hydraulic, pneumatic, electro-mechanical, etc., means, resulting in movement of the plurality of movable parts, which can be one or manual, assisted manual (e.g., whereby an operator can initiate the movement with a reduced force, etc.), or automatic. As an illustrative example, an operator manually applying pressure to mower controls 104 can cause the common or linked motion means to move mower controls in conjunction with one or more of: operator seat 102, movable cushion 103, ROP bar 110, footrest 108. Said differently, an operator applying mechanical force to a mechanical motion initiator to move a first movable part (e.g., ROP bar 110, movable cushion 103, operator seat 102, mower controls 104, footrest 108, . . . ) can result in movement of the first movable part and one or more additional movable parts (e.g., ROP bar 110, movable cushion 103, operator seat 102, mower controls 104, footrest 108, . . . ). In other embodiments, the motion initiator can be a powered means such as one or more electro-mechanical motor(s), hydraulic motor(s), pneumatic motor(s) or the like, that when mechanically or electrically engaged results in movement of the plurality of movable parts. In such embodiments, a single control input (e.g., button press, switch turn, touch-screen activator, and so forth) can initiate the powered motion initiator. In further embodiments, a combination of mechanical and powered motion initiators are within the scope of the present disclosure. Note that in some embodiments, fewer than all movable parts can be actuated by a single motion initiator. In such embodiments, a plurality of motion initiators are provided to move respective subsets of the movable parts (e.g., a first motion initiator can be provided to move ROP bar 110, a second linked motion initiator to move both movable cushion 103 and mower controls 104, and a third motion initiator to move footrest 108; other combinations are within the scope of the present disclosure as well). In other embodiments, various elements (ROP bar 110, movable cushion 103, mower controls 104, etc.) can be independently movable, such that each can be separately adjusted between seated and standing positions without the other(s) being also adjusted between seated and standing positions.

In various embodiments, accessories could be mounted to the lawn maintenance apparatus 100. A hauling accessory (e.g., crate, box, wagon, etc.) could be mounted to a floorplate of the lawn maintenance apparatus when in standing configuration, or could be mounted to stand platform 130 when in sitting configuration. In further embodiments, one or more additional seats can be provided. For instance, a foldable seat (see, e.g., FIG. 31, discussed below) that folds out from behind movable cushion 103 or another portion of the rear of lawn maintenance apparatus 100 can be situated behind an operator in the standing configuration to briefly sit down in standing configuration. This foldable seat can have a movable cushion (similar to movable cushion 103) in an embodiment. In other embodiments, a post hole can be provided on a rear portion of lawn maintenance apparatus in which a seat-mounted post can be secured to add an additional seat in standing configuration. In yet another embodiment, when an operator stands on stand platform 130 with lawn maintenance apparatus 100 in sitting configuration, activation of movable controls to move the plurality of movable parts from the sitting configuration to the standing configuration can be implemented (e.g., in response to a pressure switch on stand platform 130 that senses a threshold weight or pressure on stand platform 130 to activate the movable controls).

Figure 2:
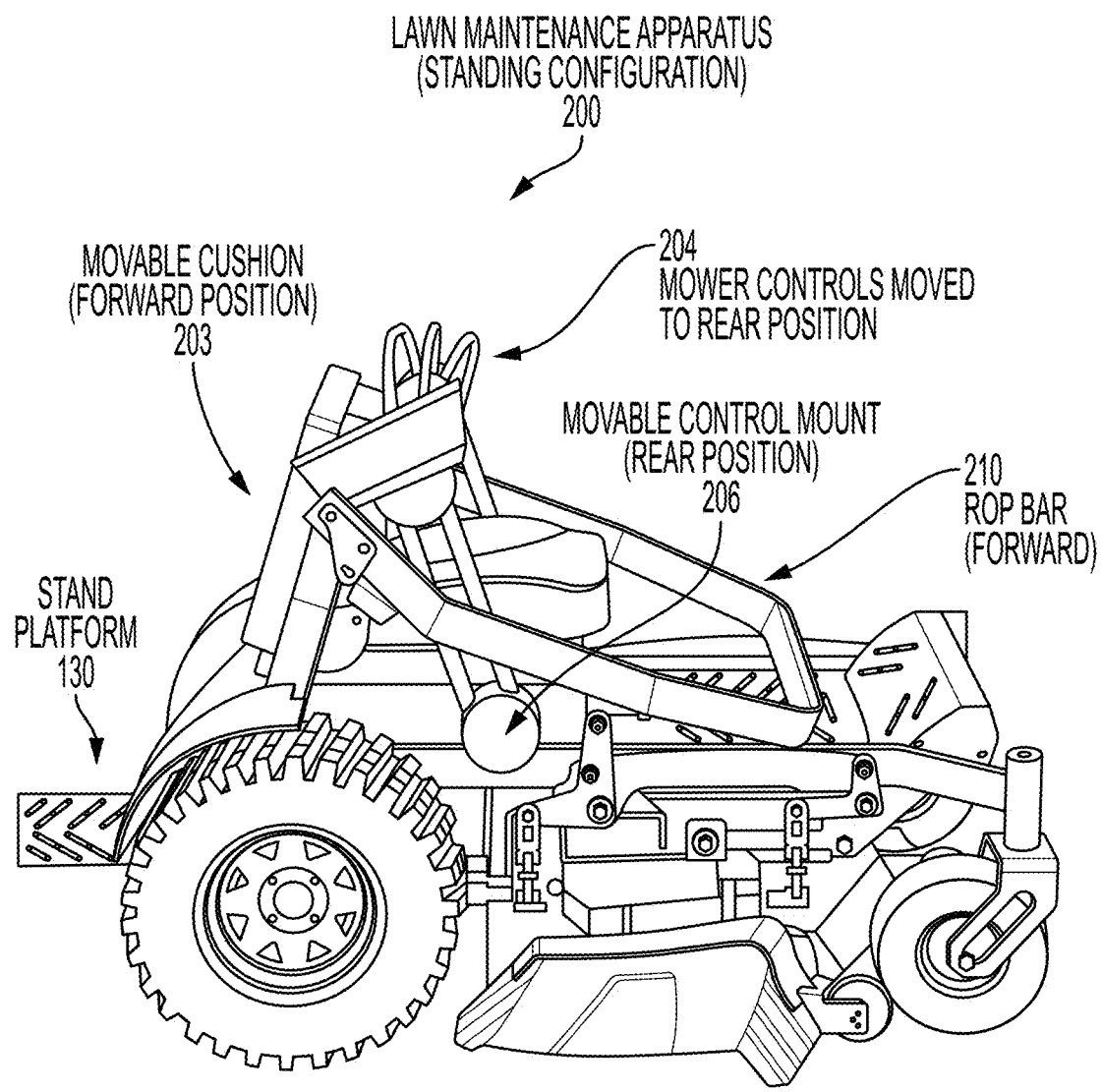
FIG. 2 depicts a picture of a convertible lawn maintenance apparatus in a standing configuration, according to further embodiments.

FIG. 2 illustrates an embodiment of lawn maintenance apparatus 100 in a standing configuration 200. Standing configuration 200 includes mower controls moved to a rear position 204 by way of pivotable movable control mount (in rear position) 206, near an operator's hands when standing on stand platform 130 (see FIG. 3, discussed below). Additionally, a padded movable cushion (in forward position) 203 is provided for an operator to lean against when standing on stand platform 130. Likewise, ROP bar 110 is folded forward at ROP pivot 112 out of an operator's physical space and field of view when standing on stand platform 130. In various embodiments, ROP bar 110 can be folded forward up against a floor plate of lawn maintenance apparatus overlying mow deck 107 and in front of footrest 108.

Figure 3:
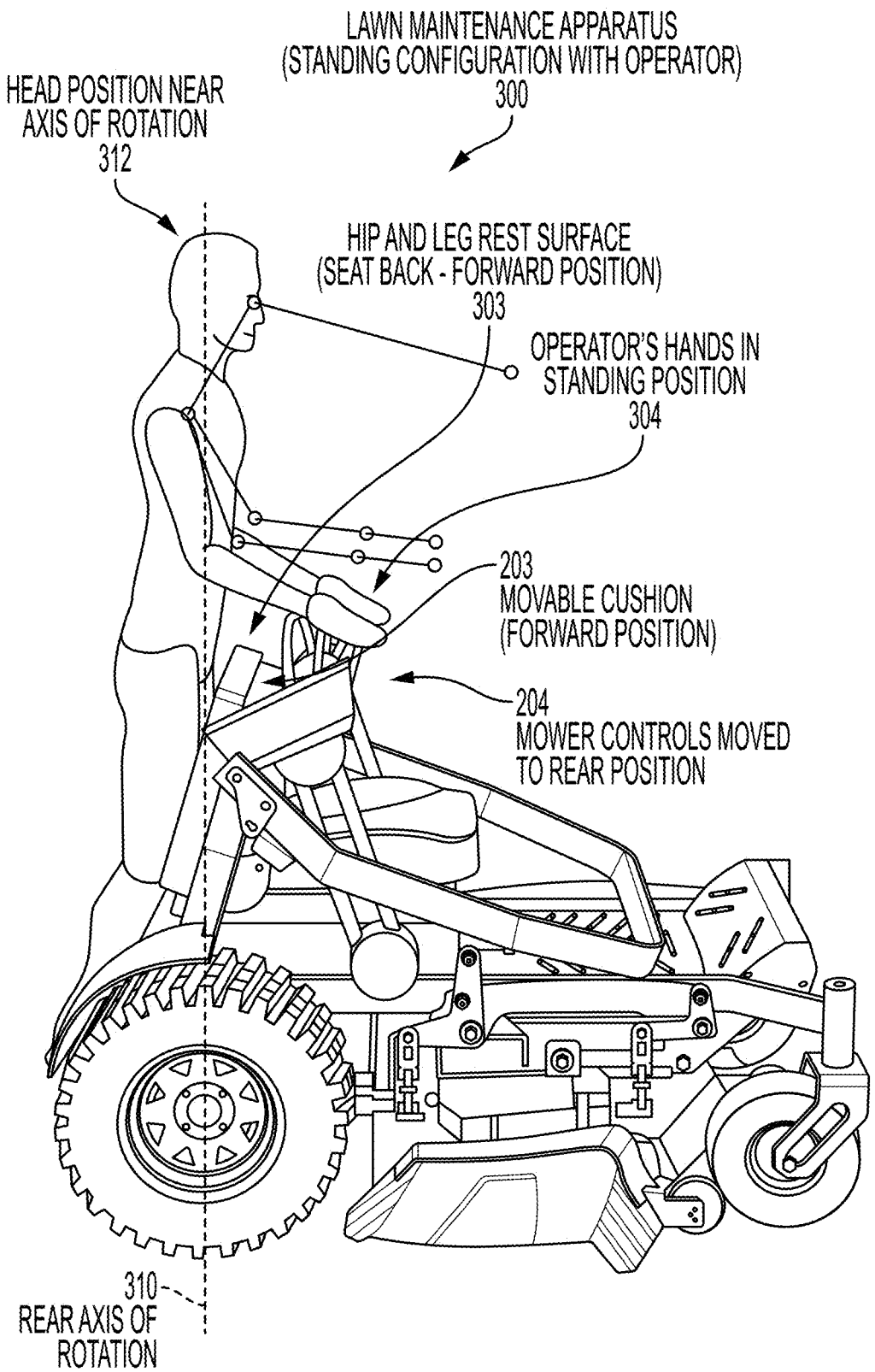
FIG. 3 illustrates a diagram of a convertible lawn maintenance apparatus in a standing configuration including operator positioning, according to some embodiments.

FIG. 3 depicts a lawn maintenance apparatus 100 with an operator in standing configuration 300. FIG. 3 depicts the operator's hands 304 positioned coincident with mower controls moved to rear position 204. This allows the user to comfortably operate the lawn maintenance apparatus 100 while in the standing configuration 300. Additionally, a surface of movable cushion 203 facing the standing operator (e.g., back, front, etc.) can be a padded surface providing a comfortable hip and leg rest surface 303 with the movable cushion in the second position. Moreover, the operator's head position 312 can be closely aligned with a vertical rear axis of rotation 310 that intersects rear wheel rotation axis 120. Vertical rear axis of rotation 310 is an axis about which lawn maintenance apparatus 100 spins when performing a turn. Thus, with operator's head position 312 near or on vertical rear axis of rotation 310, centrifugal force on operator's head position 312 is minimized.

Figure 4:
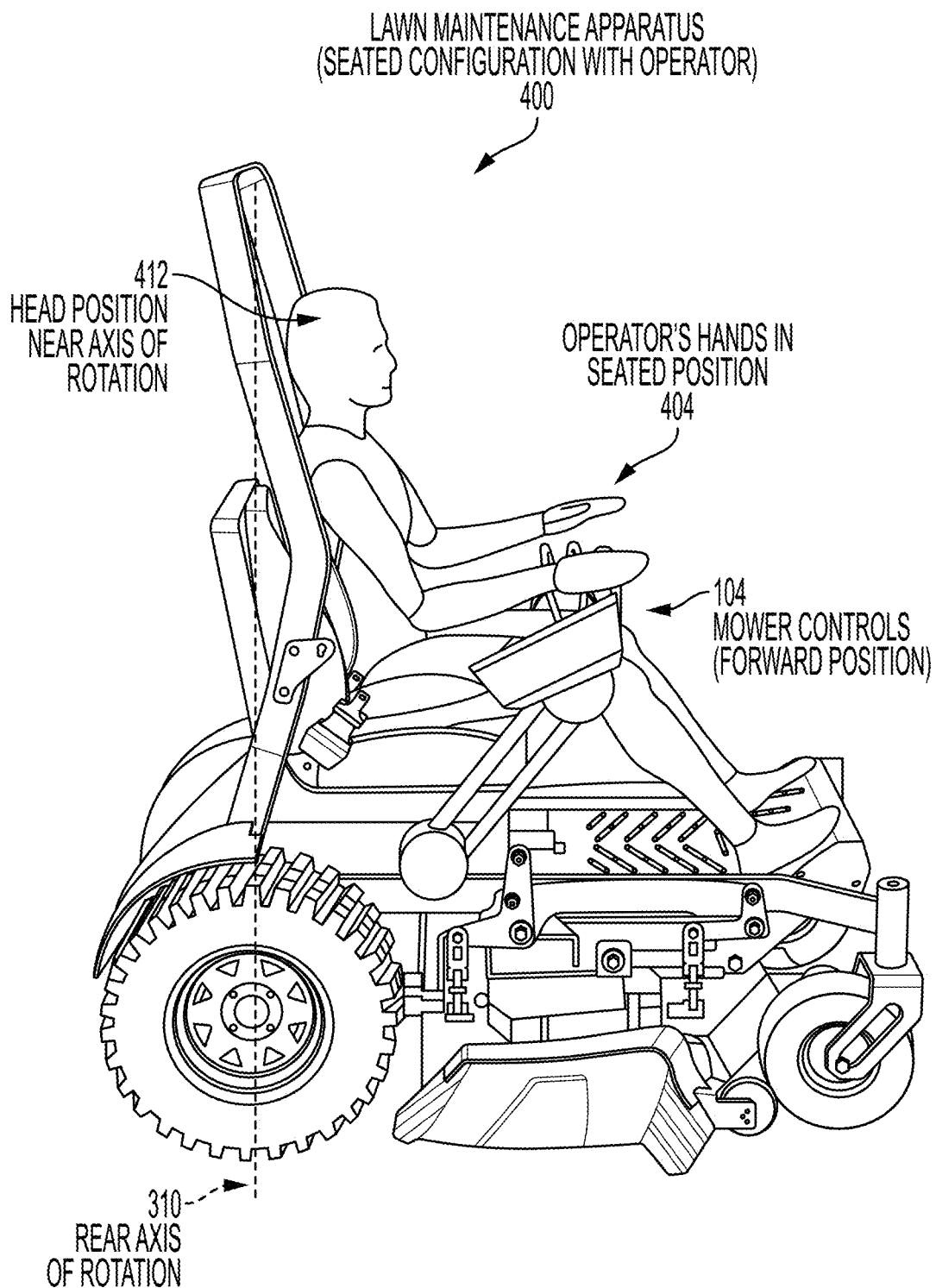
FIG. 4 depicts a diagram of a convertible lawn maintenance apparatus in a seated configuration including operator positioning, in an embodiment(s).
Figure 5:
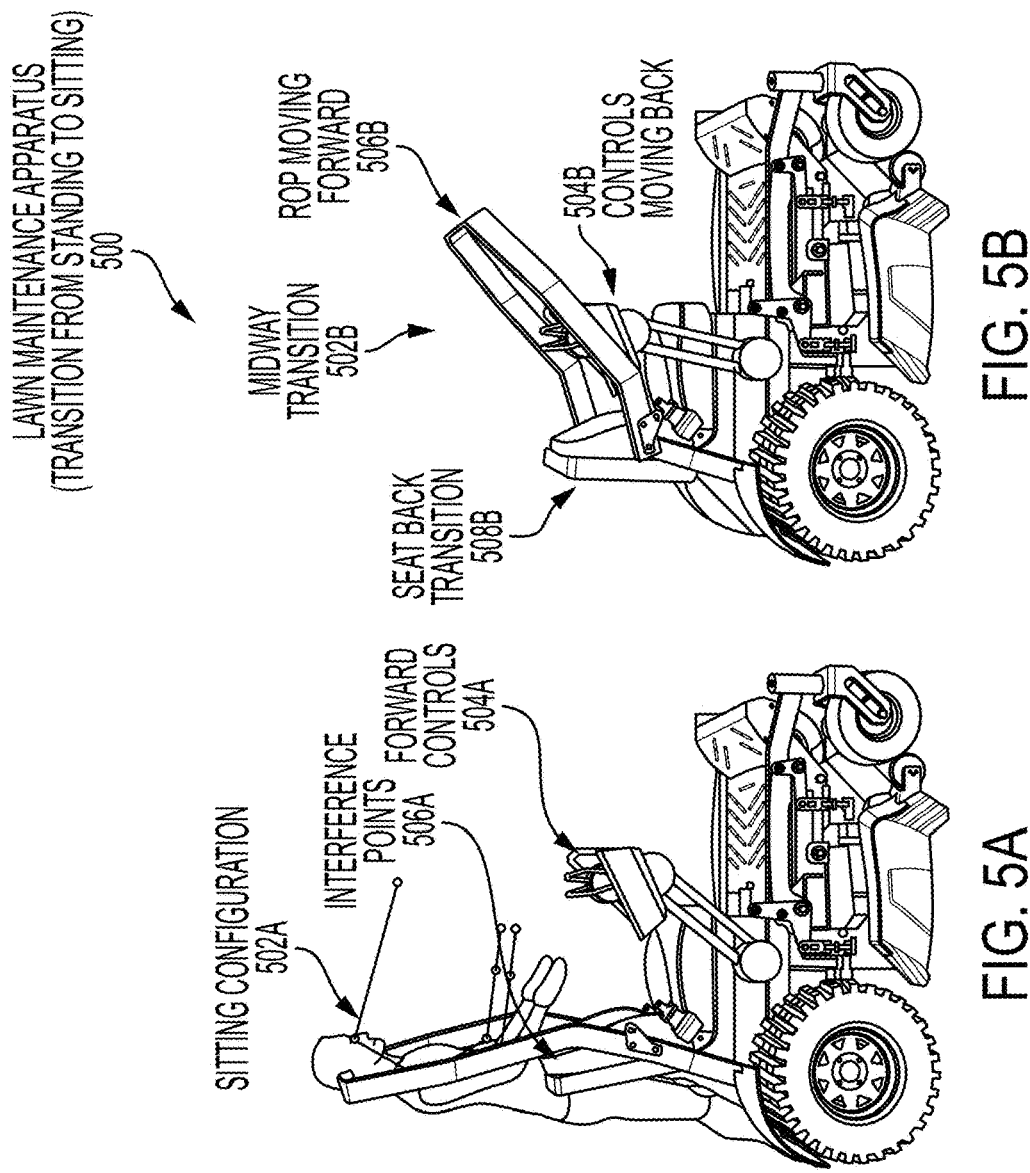
FIGS. 5A-5C illustrate progressive transition from sitting configuration to standing configuration and relative operator positioning, in further embodiments.

FIG. 4 illustrates a lawn maintenance apparatus 100 with an operator in seated configuration 400. As illustrated, an operator's hands in seated position 404 are coincident with mower controls 104 in a first (e.g., forward) position. Further, the operator's head position 412 can be at or forward of, but still near rear axis of rotation 310 to minimize centrifugal force on operator's head position 412 when in the seated configuration.

FIGS. 5A, 5B and 5C illustrate transition from standing configuration 500 to seated configuration for a lawn maintenance apparatus 100 according to further disclosed embodiments. FIG. 5A illustrates an operator standing on stand platform 130 when lawn maintenance apparatus 100 is in sitting configuration 502A. Interference points 506A are illustrated with respect to ROP bar 110 and movable cushion 103. Moreover, reach of forward controls 504A beyond an operator's hands is evident. FIG. 5A illustrates that merely putting a stand platform 130 on a rear end of a lawn maintenance apparatus 100 in sitting configuration 502A is insufficient to allow the operator to operate lawn maintenance apparatus 100 in a standing position. Accordingly, at a minimum the interference points 506A must be moved to respective standing positions that comfortably accommodate the operator in standing position. FIG. 5B depicts a midway transition 502B, in which movable cushion transition 508B begins to rotate, pivot or shift forward to remove interference point 506A at a top of movable cushion 103 and instead provide a resting surface for the legs and hips of the operator. Likewise, midway transition illustrates ROP bar 110 moving forward 506B to clear the second interference point 506A, and illustrates controls moving back 504B toward the operator's hands in standing position. FIG. 5C illustrates lawn maintenance apparatus 100 in standing configuration 502C providing a hip and leg rest 508C for the operator, rearward controls 504C at an operator's hands and ROP bar fully forward and out of a field of vision of the operator.

Figure 6:
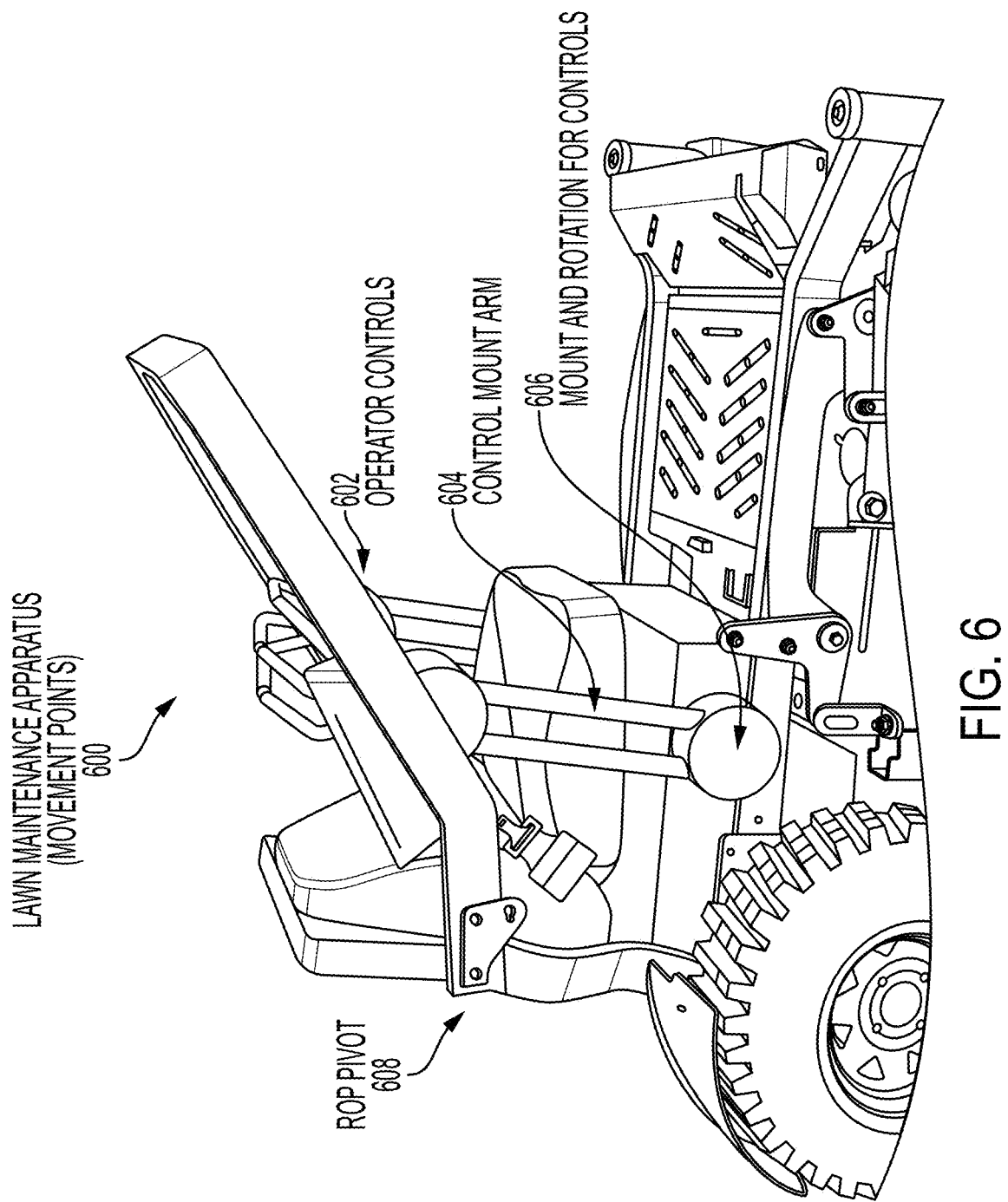
FIG. 6 depicts example attachment and pivot points for movable portions of a disclosed convertible lawn maintenance apparatus in still other embodiments.

FIG. 6 depicts a close-up of movement points 600 of lawn maintenance apparatus 100, in some disclosed embodiments. ROP pivot 608 can be a pivot device operable to fold ROP bar 110 down away from an upward position. Operator controls 602 are positioned on a control mount arm 604 which can be secured to a rotatable mount and rotation mechanism 606 for operator controls 602. Rotatable mount and rotation mechanism 606 can rotate between a forward position in which operator controls 602 are in position for a seated operator, and a rear position in which operator controls 602 are in position for a standing operator.

As discussed above, movable cushion 103 (and/or other movable cushions discussed herein) can be employed as a seat back for an operator when lawn maintenance apparatus 100 (and/or other lawn maintenance apparatuses, power equipment, etc., discussed herein) is in a seated mode, and can be employed as a hip and/or leg pad when lawn maintenance apparatus 100 (etc.) is in a standing mode. Depending on the embodiment, movable cushion 103 can change positions (from a first (e.g., seated) position to a second (e.g., standing) position) by one or more of: folding, sliding and/or rotating along a track, rotating around an axis (e.g., one internal to the movable cushion, or an external one the movable cushion is mounted or attached to, wherein the axis can be fixed or movable in one or two dimensions), removable from a first mount/clip and attach the same or another movable cushion to the first mount/clip (at the same or another position) or a second mount/clip, etc.

Although lawn maintenance apparatus includes ROP bar 110, some embodiments (e.g., consumer models, etc.) can omit ROP bar 110. In embodiments in which it is included, ROP bar 110 can be upright in the seated mode, whereby it can provide ROP, and can be folded down (e.g., folded forward, folded backward, etc.) and/or removed in the standing mode.

As discussed above, mower controls (e.g., 104, 204, etc.) can be at a first position (e.g., for seated operation) and a second position (e.g., for standing operation). In some embodiments, mower controls can move between the first position and the second position, while in other embodiments, mower controls can be removable from a first mount/clip and attach the same or another movable cushion to the first mount/clip (at the same or another position) or a second mount/clip, etc. Although referred to above as a first position and a second position, various embodiments can employ adjustable mower controls such that a first range of positions (e.g., customizable for operator(s)) can be employed for seated operation and a second range of positions (e.g., customizable for operator(s)) can be employed for standing operation.

Various embodiments can employ operator presence control (OPC), whereby operation (e.g., an ability to begin and/or maintain operating) of the lawn maintenance apparatus can be conditioned on detecting an operator presence at one or more of the stand platform or the operator seat. In various embodiments, one or both of the stand platform or operator seat can be spring loaded for OPC and suspension, although other techniques can be employed to detect an operator additionally or alternatively. In some embodiments, OPC can be checked at either location regardless of the configuration of lawn maintenance apparatus (e.g., in some such embodiments wherein lawn maintenance apparatus can automatically change between the seated and the standing mode, one or more components of the lawn maintenance apparatus can transition to the mode associated with the location where OPC is detected, if not already in that mode). In other embodiments, OPC can be checked only at the stand platform when the lawn maintenance apparatus is in the standing mode, and only at the operator seat when the lawn maintenance apparatus is in the seated mode (e.g., in some such embodiments, operation can be disabled unless the lawn maintenance apparatus is fully in the standing mode or fully in the seated mode).

As discussed above, conversion of one or more components (e.g., ROP bar, movable cushion, controls, footrest, etc.) of the lawn maintenance apparatus from position(s) associated with the seated mode to position(s) associated with the standing mode can be automatic, manual, or assisted manual, and can employ one or more of mechanical, electromechanical, electric, electronic, pneumatic, hydraulic, hydrostatic, etc. means. In embodiments with automatic conversion, conversion can occur in response to one or more of a user input, detected operator presence, etc. Additionally, in any such embodiment, movement between two or more components of the lawn maintenance apparatus can be linked in any combination, such as ROP bar with movable cushion, ROP bar with controls, ROP bar with footrest, movable cushion with controls, movable cushion with footrest, controls with footrest, ROP bar with movable cushion and controls, all four components, etc. In some embodiments (e.g., embodiments wherein not all components convert automatically, etc.), an optional display included on lawn maintenance apparatus can provide user guidance for conversion of one or more components between the seated and standing positions associated with the one or more components. In some such embodiments, the user guidance can be based on a present status or position of those components.

Figure 7:
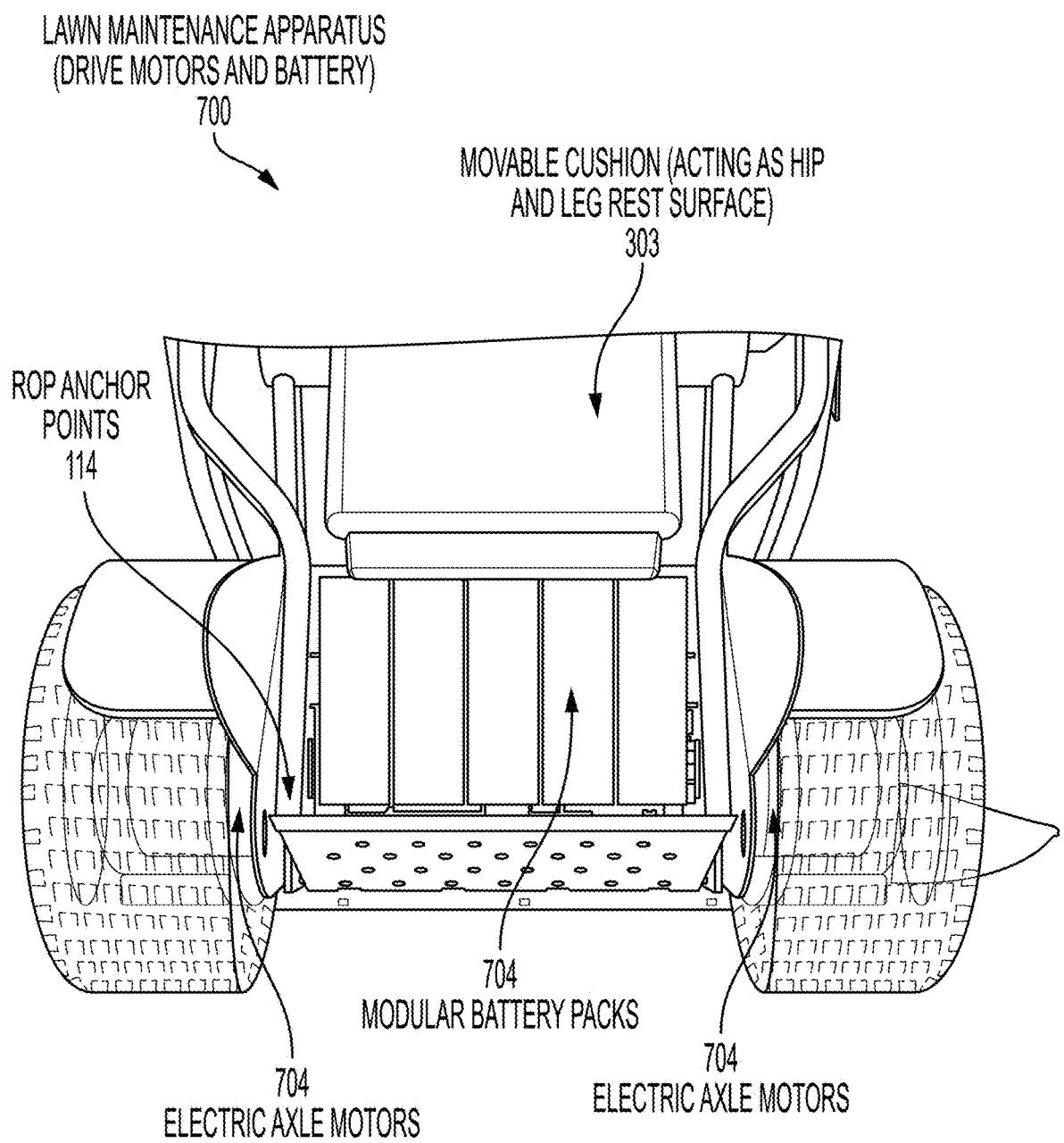
FIG. 7 illustrates a diagram of a convertible lawn maintenance apparatus with on-axle electric motors and modular battery packs, in an embodiment(s).

FIG. 7 depicts lawn maintenance apparatus 700 according to alternative or additional embodiments of the present disclosure. In some embodiments, lawn maintenance apparatus 700 can have some or all features of lawn maintenance apparatus 100 disclosed herein, although the present disclosure is not so limited, and lawn maintenance apparatus 700 may have only a subset of features of lawn maintenance apparatus 100. In some embodiments, lawn maintenance apparatus 700 illustrates a ROP anchor point 114 near a rear axle of lawn maintenance apparatus 700. Also illustrated is the hip and leg rest surface 303 of disclosed lawn maintenance apparatuses.

In addition to the foregoing, lawn maintenance apparatus 700 can be an electrically powered apparatus having batteries and one or more electric motors. As one example, electric axle motors 704 can be positioned left and right rear axles of lawn maintenance apparatus 700 and can provide motive power for the left and right rear wheels, respectively. Electrical power can be stored with a set of modular battery packs 704. Modular battery packs can be independently removable and replaceable.

Figure 8:
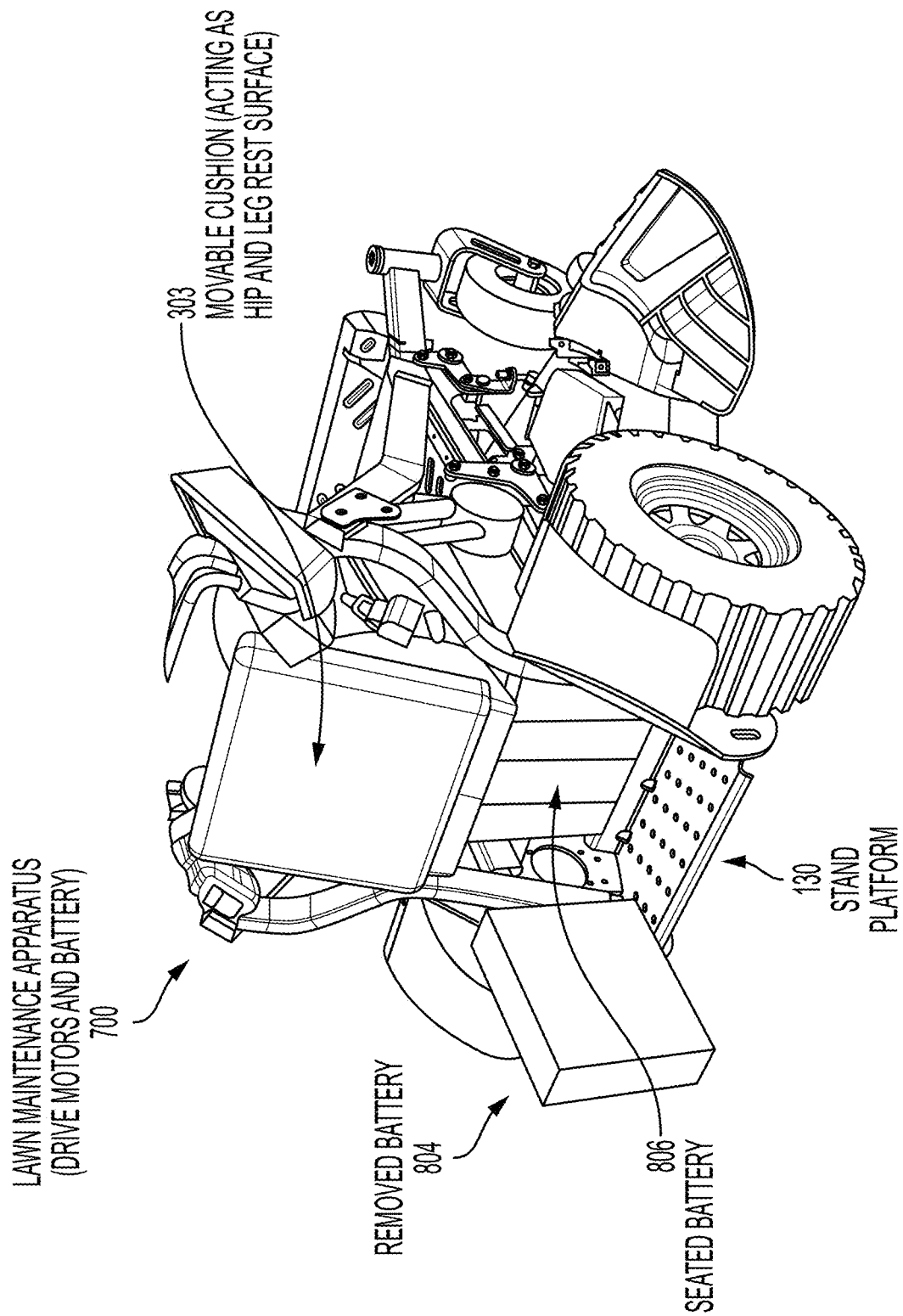
FIG. 8 includes a diagram of a convertible lawn maintenance apparatus with a modular battery pack removed and electrically decoupled in one or more embodiments.

As illustrated in FIG. 8, modular battery packs 704 can be independently removed from lawn maintenance apparatus 700. A removed battery 804 is illustrated in contrast with a plurality of seated batteries 806, behind stand platform 130. In an embodiment, modular battery packs 704 can be wireless batteries having fixed electrical contacts that make electrical contact to a wire harness (not depicted) when seated within a battery bay of lawn maintenance apparatus, and can be electrically disconnected from the wire harness when physically removed from the battery bay.

In some embodiments, the battery bay can be beneath or approximately beneath a seat bottom of the lawn maintenance equipment, and can comprise a battery tray configured to slide between an operating position within the lawn maintenance apparatus 700 and a loading/unloading position that can allow for batteries to be vertically placed into the battery tray. The operating position can be behind the seat bottom and above the standing platform, allowing vertical access to the battery tray. The batteries can be electrically connected to the lawn maintenance apparatus when the battery tray is in the operating position (within the battery bay), and the electrical connectivity of the batteries in the loading/unloading position can depend on the embodiment. In some embodiments, the batteries can be electrically connected to the lawn maintenance apparatus when in the battery tray while it is in the loading/unloading position (but can optionally be switched off). In other embodiments, the batteries in the battery tray can be electrically connected to the battery tray while it is in the loading/unloading position, but not to the lawn maintenance apparatus until the battery tray is in the operating position (e.g., the connection between the batteries and the lawn maintenance apparatus can be through the battery tray once in the operating position in the battery bay, etc.). In further embodiments, the batteries in the battery tray can be electrically isolated unless the battery tray is in the operating position (e.g., the connection between the batteries and the lawn maintenance apparatus can be made once the batteries are slid into position along with the battery tray, etc.). In various embodiments, the battery tray can be accessed regardless of the position(s) of the ROP bar, movable cushion, mower controls, etc.

In some embodiments, electrical connections on the lawn maintenance apparatus and/or battery/batteries can be covered when not connected to one another, for example, with spring-loaded or otherwise retractable covers that can retract as they are pushed together, which can help keep electrical contacts clean and free of dirt, lawn clippings, etc.

In various embodiments, one or more physical alignment features can be included on at least one of the battery tray, removable battery/batteries, or an interior portion of the battery bay other than the battery tray. In various embodiments, the physical alignment feature(s) can at least one of: facilitate physical alignment of the battery/batteries with an interior of the battery bay to ensure electrical connection of the battery/batteries, prevent insertion of the battery/batteries and/or battery tray if the battery/batteries are not aligned properly, and/or prevent damage (e.g., to the battery/batteries, battery bay, battery tray, etc.) that might otherwise result from misalignment.

As one example, one or more handles can be included on the battery/batteries (e.g., such as those discussed below in connection with FIG. 12, or other handles, etc.), and can help facilitate physical alignment of the battery/batteries in one or more ways. For example, if the battery/batteries are aligned closely enough for the handle(s) to align with a track or other portion of the interior of battery bay, this can provide smaller adjustment(s) to ensure proper alignment of the battery/batteries. Additionally or alternatively, if the battery/batteries are not aligned closely enough for the handle(s)/track(s) to align, the misalignment can optionally prevent the battery tray from closing. As another option, the handles can optionally retract into or fold down onto the battery/batteries, wherein the retraction or folding can be caused by alignment of the battery/batteries or handle with a feature of the battery bay (if sufficiently aligned), such that the battery tray will not close if misaligned. Additionally or alternatively, handle and/or track features can ensure that the battery/batteries have an appropriate orientation, and optionally can prevent putting the battery tray in the operating position when they have an inappropriate orientation.

Additionally or alternatively, the battery tray can have raised/contoured features (e.g., on the top of a bottom surface, etc.) that can engage with matching raised/contoured features on the underside of the battery/batteries. In various embodiments, these features can ensure that the battery/batteries will not fully insert down into the battery tray unless properly aligned, and optionally can be such that the battery can only be inserted with an appropriate orientation. In some such embodiments, the battery tray will not be able to close if a battery is misaligned, because the misaligned battery/batteries will not be low enough for insertion into the battery bay.

In embodiments wherein the lawn maintenance apparatus has a display interface, the display can optionally provide user guidance related to one or more of battery insertion, removal, or replacement. In some such embodiments, an auxiliary power source (e.g., small rechargeable or replaceable battery/batteries, etc.) can be provided to ensure that the display interface is powered during battery insertion, removal, or replacement. In various embodiments, context-specific feedback or information can be provided to a user (e.g., if the battery tray is electrically connected to the battery/batteries, an indication can be given for each battery location of the tray whether a battery with sufficient charge is detected at that location, where no such detected battery could result from a discharged battery, a misaligned battery, etc.).

In some embodiments, one or more features (e.g., a lever) can provide a mechanical advantage that can assist an operator in securing the battery tray (e.g., when loaded) in the operating position in the battery bay. In various embodiments, a locking feature can be included to lock the battery tray in the operating position. In some embodiments, the mechanical advantage feature(s) can act as the locking feature or part of the locking feature once the battery tray is in the operating position. One example embodiment can comprise a door that can cover a back face of the battery bay, be hinged at the bottom, and capable of folding down over the standing platform. When folded down over the standing platform, the door can provide a track for the battery tray to slide or roll along, and when the battery tray is partly within the battery bay, the door can be used as a lever to assist an operator in placing the battery tray in the operating position. Additionally or alternatively, the door can lock or be locked when in its upright position.

Figure 9:
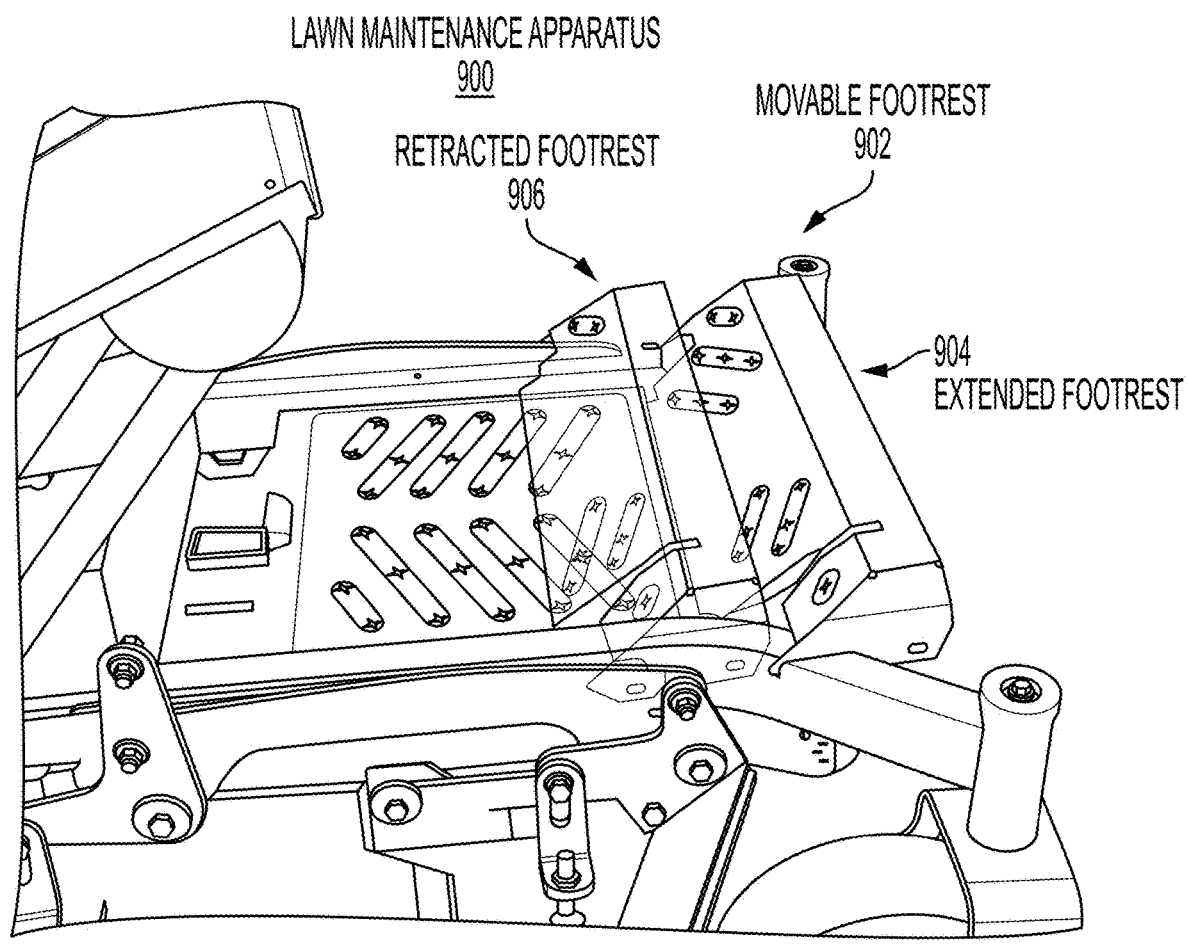
FIG. 9 depicts a diagram of an example slidable footrest to accommodate different size operators, in an embodiment.

In alternative or additional embodiments, FIG. 9 illustrates a lawn maintenance apparatus 900 with a movable footrest 902. The movable footrest 902 can accommodate different size operators when lawn maintenance apparatus 900 is in a seated configuration. Movable footrest 902 can be moved between an extended footrest 904 and a retracted footrest 906. In various embodiments, control(s) can be included to one or more of lock movable footrest 902 or release movable footrest 902 to allow adjustment, and in some such embodiments, the control(s) can be usable by an operator's foot (e.g., a pedal, etc.) and/or hand (e.g., a lever, button, etc.). In some embodiments, movable footrest 902 can be spring-biased back to a home position (e.g., a closest position to an operator seat, etc.), but can be easily offset with pressure from an operator's feet. Additionally or alternatively, some embodiments can provide a movable footrest 902 or stationary footrest that allows for an operator to see the front of a cutting deck of a lawn maintenance apparatus, for example, when the operator is in a standing position, or in either a seated or standing position. In some such embodiments, the footrest and/or floorboard can allow for the operator to see through them, such as by being made of a transparent material (e.g, Plexiglas®, etc.), having slots/grating/holes/mesh/etc. that allows the operator to see through the floorboard/footrest to the front of the cutting deck. In other such embodiments, the floorboard/footrest can slide back (or forward to undo) or fold up (or fold down to undo) to allow an operator to see the front of the cutting deck (e.g., manually, automatically in response to user input, automatically in response to detected operator presence, etc.).

Figure 10:
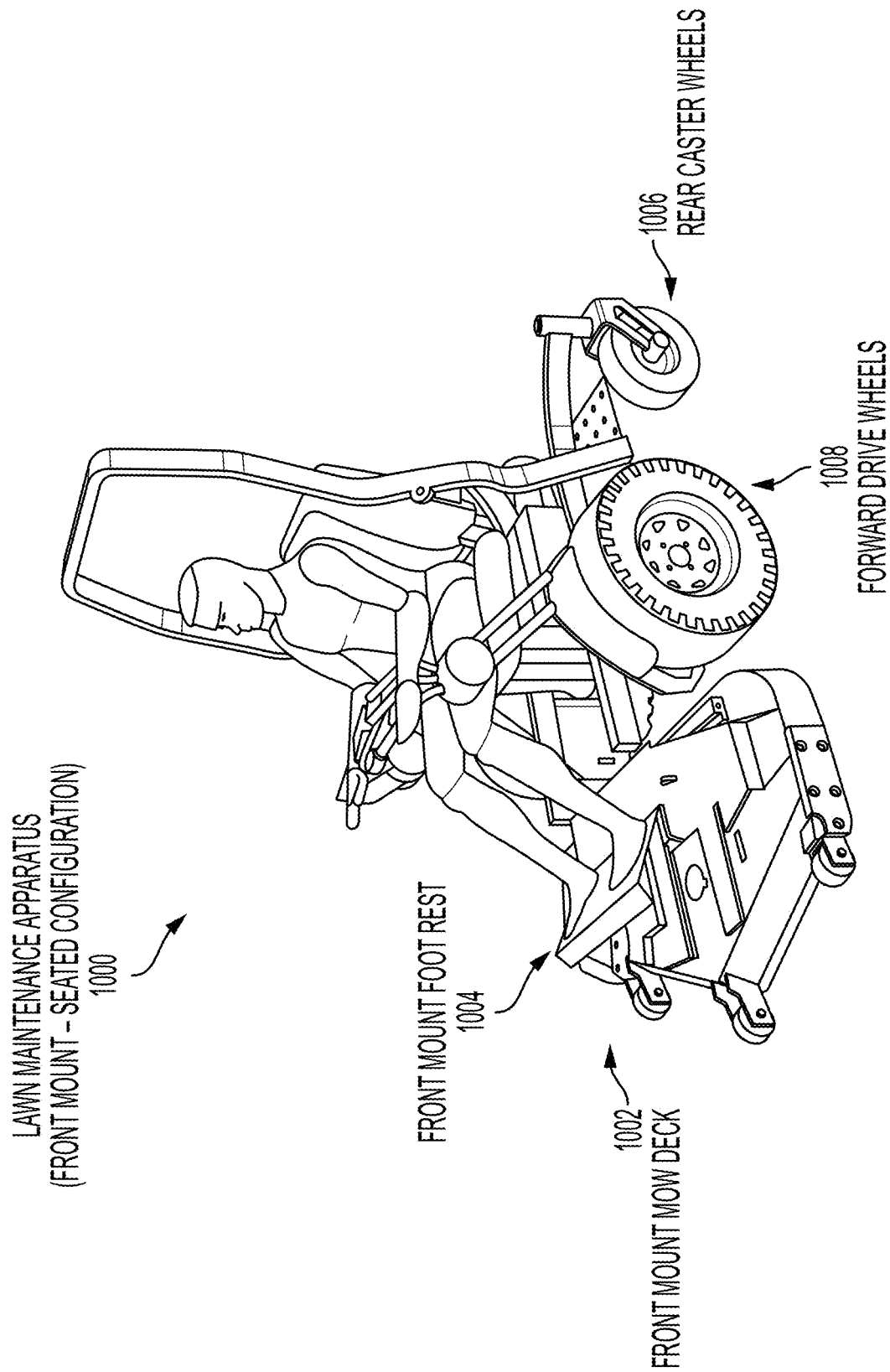
FIG. 10 illustrates an example diagram of a front-mounted convertible lawn maintenance apparatus in seated configuration, according to additional embodiments.

FIG. 10 depicts a diagram of an example front mounted lawn maintenance apparatus 1000, according to alternative or additional embodiments of the present disclosure. Front mounted lawn maintenance apparatus 1000 can be changed between the seated configuration illustrated in FIG. 10 and a standing configuration in FIG. 11. Front mounted mow deck 1002 is positioned in front of forward drive wheels 1008 (as well as rear caster wheels 1006). Additionally, a front mount foot rest 1004 is provided on front mount mow deck 1002.

Figure 11:
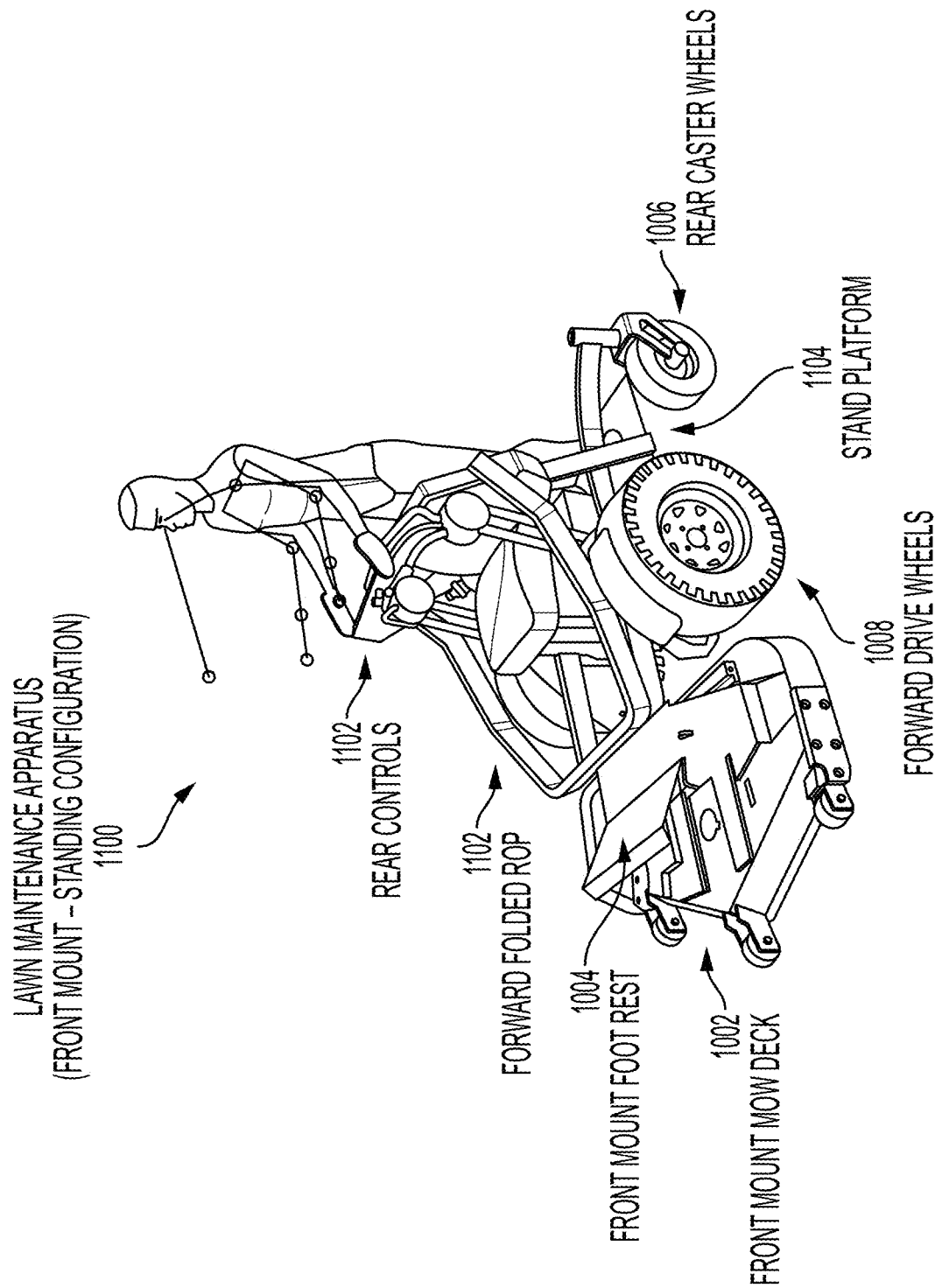
FIG. 11 depicts an example diagram of a front-mounted convertible lawn maintenance apparatus in standing configuration, in a further embodiment(s).

FIG. 11 illustrates a diagram of front mounted lawn maintenance apparatus 1000 in a standing configuration 1100. An operator on a stand platform 1104 has the controls in a rear position 1102 coincident with their hands' natural position when standing on stand platform 1104. As illustrated, front mounted lawn maintenance apparatus 1000 can have a forward folded ROP 1102 while in standing configuration 1100 to remove the ROP bar 110 from a field of view of the operator.

In various embodiments, steering can be via the drive wheels of lawn maintenance equipment and/or one or more wheels (e.g., casters, etc.) can have independent motor(s) that can be used for steering those wheel(s).

Figure 12:
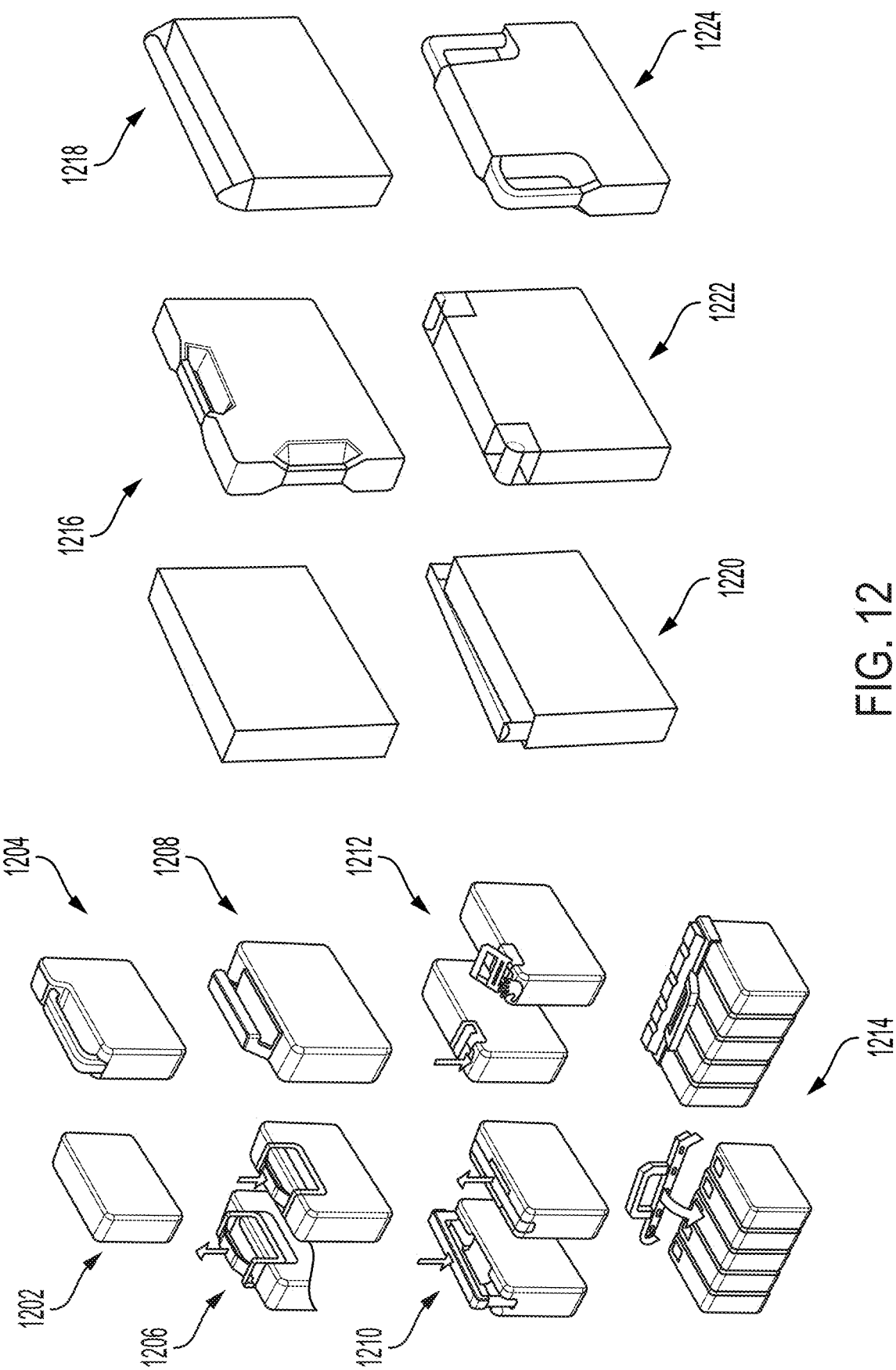
FIG. 12 illustrates images showing different handles that can be included on removable batteries, in connection with various aspects discussed herein.

Referring to FIG. 12, illustrated are images showing different handles that can be included on removable batteries 1202-1224, in connection with various aspects discussed herein. As shown in FIG. 12, one or more handles can be optionally included, which can be at one or more corners and/or sides of the battery, and which can be of various shapes and sizes, and have various types of grips. For example handles can be from a space cut out of a box or other shape of a battery (e.g., 1204, 1216-1224, etc.), or can extend past a box or other shape of the battery (e.g., 1202, 1206-1214, etc.). Handles can be retractable (e.g., 1202, 1206, 1210, 1212, etc.), removable (e.g., 1214, etc.) or fixed (e.g., 1204, 1216-1224, et.), and in some embodiments can be used as alignment features for the battery. The specific options depicted in and discussed in connection with FIG. 12 are solely for the purposes of illustration, and various embodiments can use the same, similar, or different handle(s).

FIGS. 13-18 illustrate images of a second example embodiment of a lawn maintenance apparatus that can convert between a seated mode and a standing mode. The prototype second example embodiment shows three c-shaped metal bars in place of mower controls, but any of a variety of controls can be employed in various embodiments, including but not limited to those discussed herein.

Figure 13:
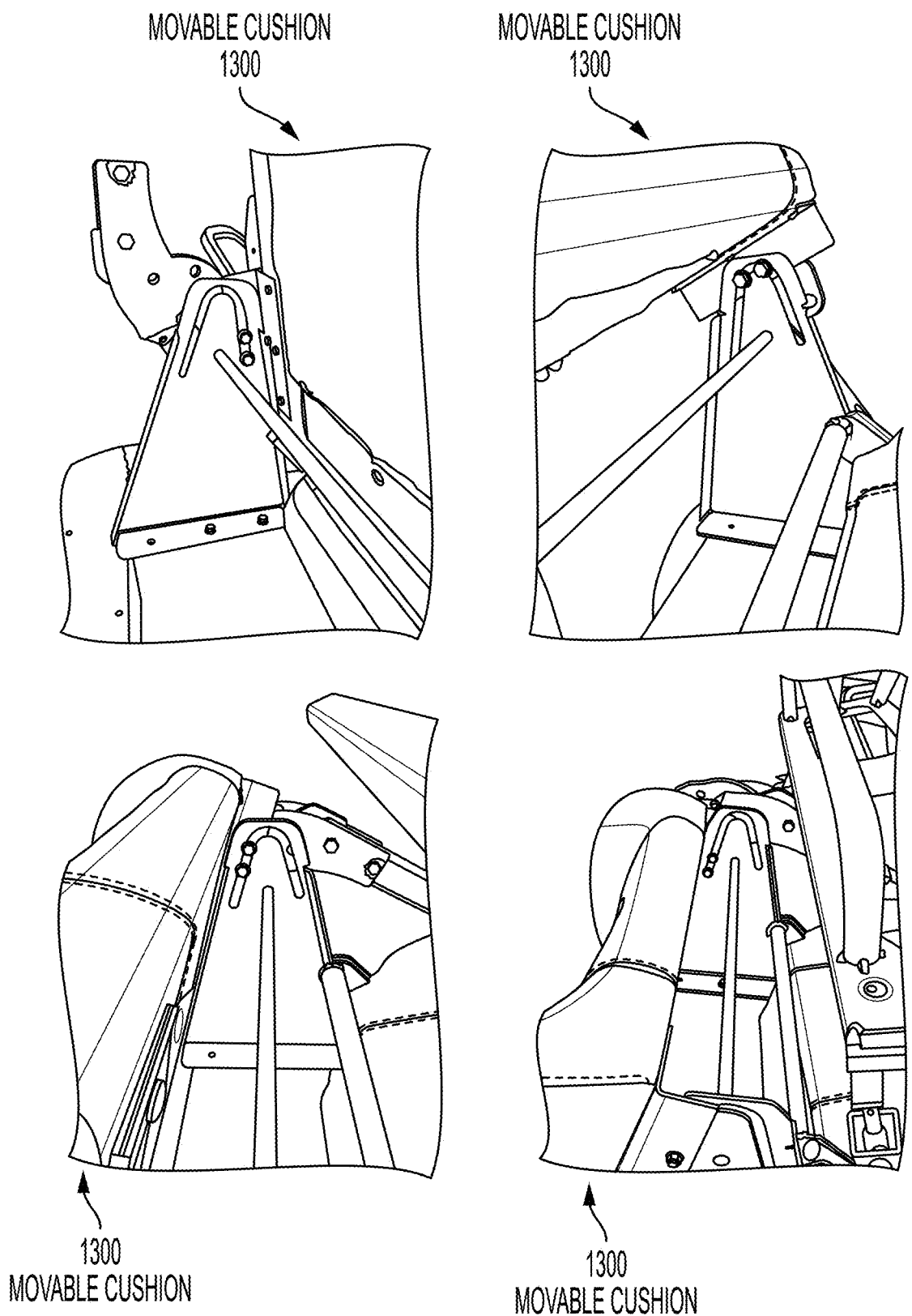
FIG. 13 illustrates four images showing transition of a movable cushion between a seated position (upper left) and a standing position (lower right), in connection with the second example embodiment.

Referring to FIG. 13, illustrated are four images showing transition of a movable cushion 1300 between a seated position (upper left) and a standing position (lower right), in connection with the second example embodiment. As can be seen in FIG. 13, the movable cushion 1300 of the second example embodiment can slide along a track, such that it can slide up along a first straight portion of the track from a seated position, rotate around a curved position of the track, and slide down a second straight portion of the track into a standing position (or the reverse, to convert from the standing position to the seated position). In the second example embodiment, the same surface of the movable cushion 1300 acts as both the seat back in the seated position and the hip and/or leg pad in the standing position.

Figure 14:
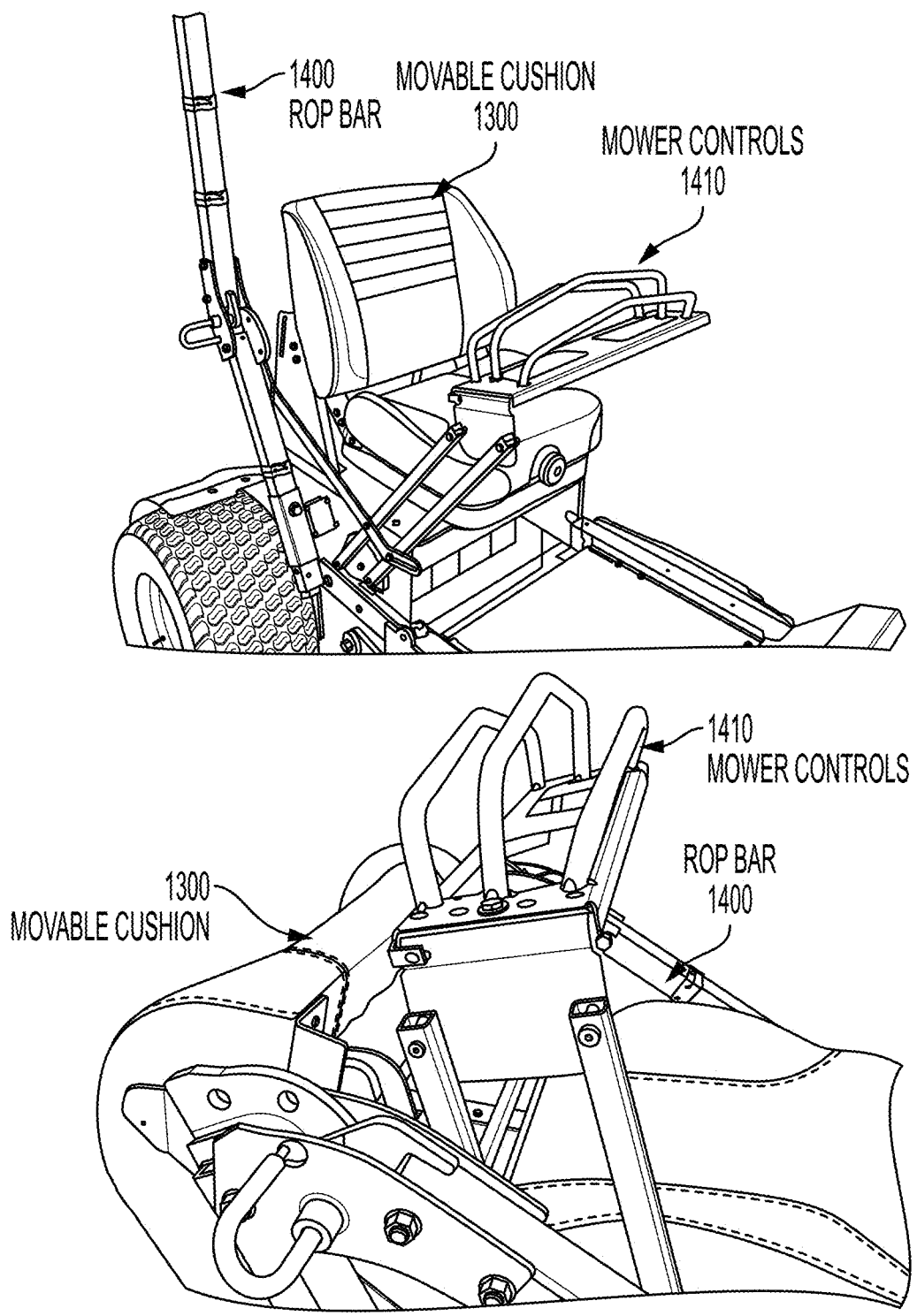
FIG. 14 illustrates a pair of images showing the second example embodiment in a seated mode (top image) and a standing mode (bottom image), in connection with various aspects discussed herein.

Referring to FIG. 14, illustrated are a pair of images showing the second example embodiment in a seated mode (top image) and a standing mode (bottom image), in connection with various aspects discussed herein. In the top image, movable cushion 1300, the ROP bar 1400, and the mower controls 1410 are all in respective first positions for seated operation, while in the bottom image, they are all in respective second positions for standing operation, with the ROP bar 1400 folded forward, the movable cushion 1300 acting as a hip/leg pad, and the controls 1410 moved up and back from the seated position.

Figure 15:
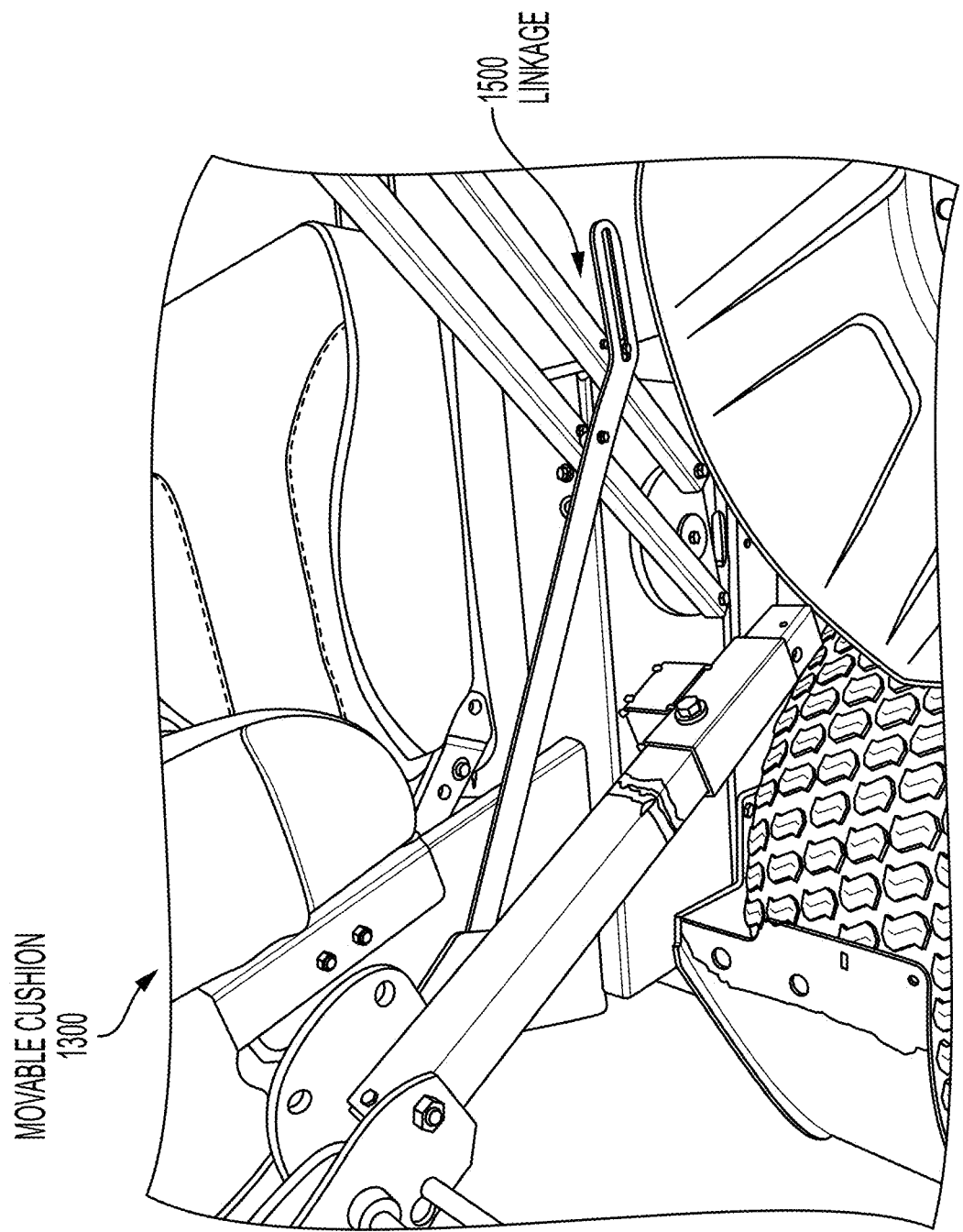
FIG. 15 illustrates an image showing a mechanical linkage connecting the rollover protection (ROP) bar and controls in the second example embodiment, in connection with various aspects discussed herein.
Figure 16:
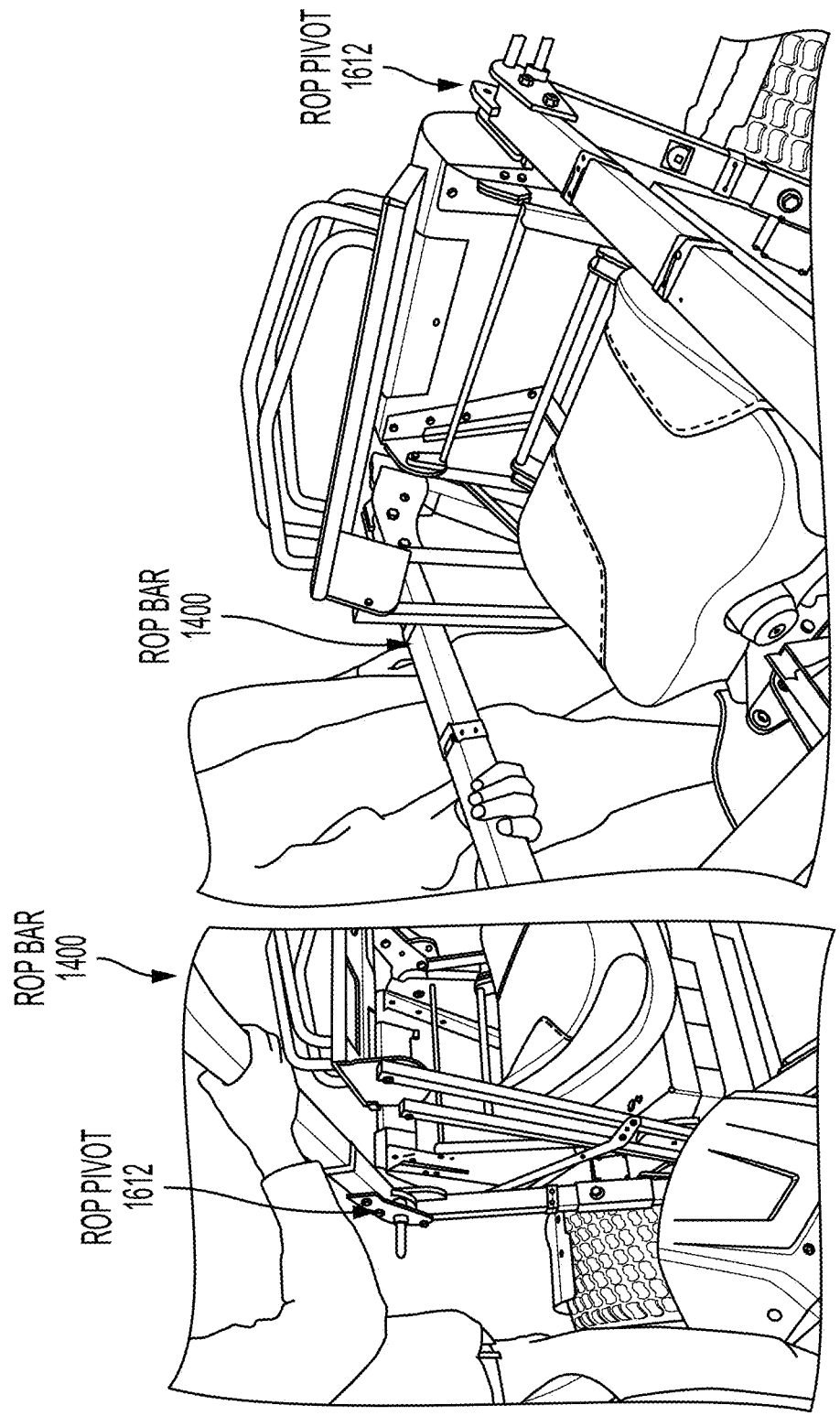
FIG. 16 illustrates a pair of images showing transition of the ROP bar and controls to a standing position, in connection with various aspects discussed herein.

Referring to FIG. 15, illustrated is an image showing a mechanical linkage 1500 connecting the ROP bar 1400 and controls 1410 in the second example embodiment, in connection with various aspects discussed herein. In the second example embodiment, the ROP bar 1400 and controls 1410 are mechanically linked such that transitioning one of them (e.g., the ROP bar 1400) from the seated position to the standing position (or vice versa) causes the other (e.g., mower controls 1410) to make the same transition. Referring to FIG. 16, illustrated are a pair of images showing transition of the ROP bar 1400 and controls 1410 to a standing position, in connection with various aspects discussed herein. ROP bar 1400 can be configured to fold about a pair of ROP pivots 1612 from a seated riding position (with ROP bar 1400 in an upright position) to a standing riding position (with ROP bar 1400 in a folded position) or vice versa.

Referring to FIG. 17, illustrated are a pair of images showing a locking mechanism 1710 that can secure a ROP bar 1400 (at the location of ROP pivots 1612) in an upright position for seated operation, in connection with the second example embodiment.

Figure 18:
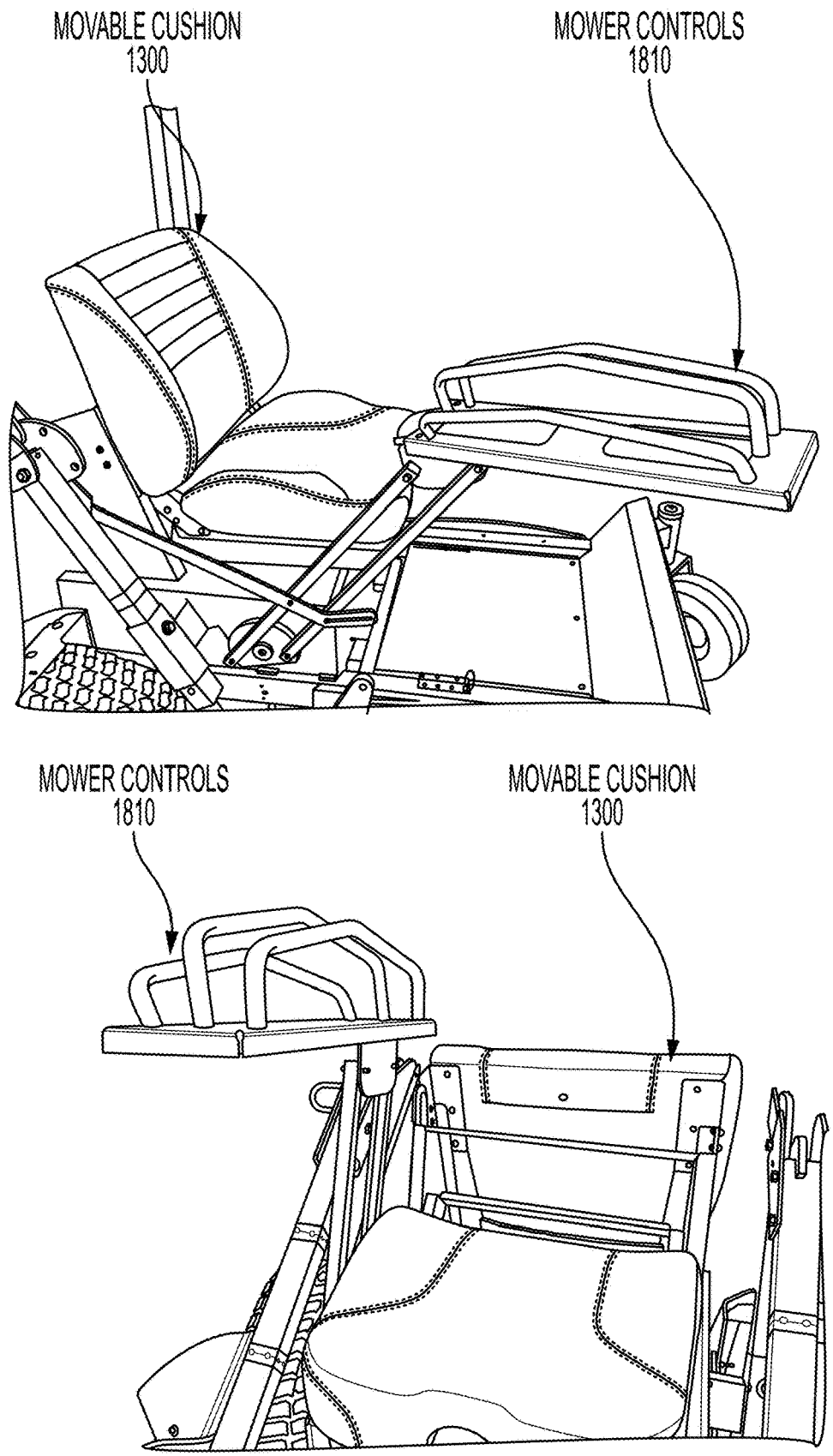
FIG. 18 illustrates a pair of images showing mower controls that can rotate outward to allow operator ingress and/or egress from a seated operating position, in connection with the second example embodiment.

Referring to FIG. 18, illustrated is a pair of images showing mower controls 18180 that can rotate outward to allow operator ingress and/or egress from a seated operating position, in connection with the second example embodiment.

In the first example embodiment discussed in connection with FIGS. 1-11 and the second example embodiment discussed in connection with FIGS. 13-18, the movable cushion (e.g., 103 or 1300, etc.) is a single cushion used by the operator in both the seated position (e.g., as a seat back, etc.) and the standing position (e.g., as a hip/lap pad, etc.). However, in other embodiments, a movable cushion can be employed that is only used as an operator cushion in one of the seated position or the standing position. For example, some embodiments can employ three cushions: a first cushion that can act as an operator seat bottom for seated operation, a second cushion that can act as an operator hip/lap pad for standing operation, and a third cushion (e.g., a movable cushion) that can act as an operator seat back for seated operation and be moved to another position for standing operation without being used as a cushion for standing operation (e.g., by folding, rotating, etc. down over the seat bottom to be out of the way of a standing operator, etc.). Additionally, while the first and second cushions can be fixed, they can also be adjustable, movable, removable, etc. in various embodiments.

FIGS. 19-28 illustrate images of example embodiments of control interfaces for a lawn maintenance apparatus or other outdoor power equipment, including one that can convert between a seated mode and a standing mode. However, the specific options depicted in and discussed in connection with FIGS. 19-28 are solely for the purposes of illustration, and various embodiments can use the same, similar, or different control(s)/user interface(s).

Figure 19:
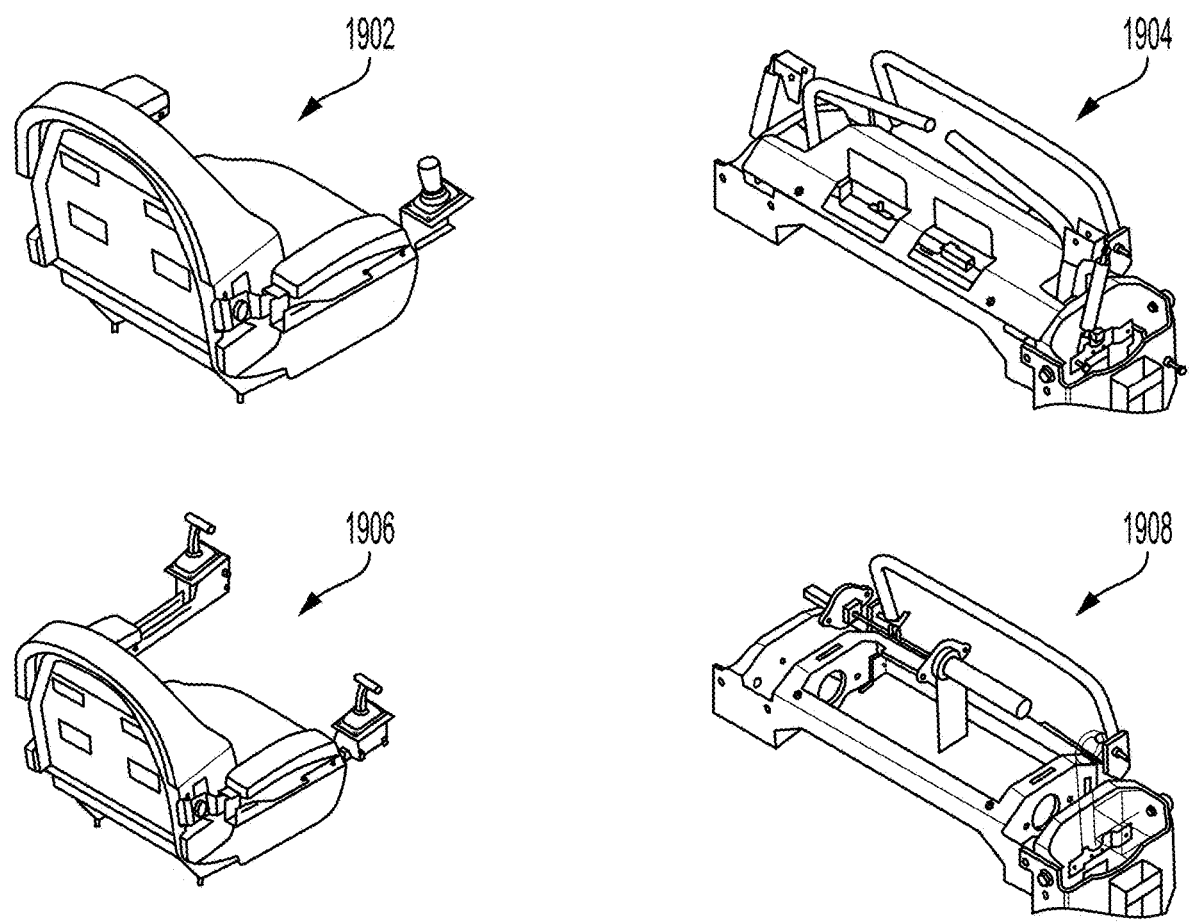
FIG. 19 illustrates four images showing example control configurations employable by various embodiments, in connection with various aspects discussed herein.

In various embodiments, outdoor power equipment discussed herein can employ any of a variety of controls and control configurations (e.g., for acceleration, steering, etc.). Referring to FIG. 19, illustrated are four images 1902-1908 showing example control configurations employable by various embodiments, in connection with various aspects discussed herein. FIG. 19 shows a single joystick control configuration (1902), a dual lap bar control configuration (1904), a dual joystick control configuration (1906), and a throttle-based control configuration (1908).

Referring to FIG. 20, illustrated are images of an example control configuration for an outdoor power equipment, in connection with various aspects discussed herein. FIG. 20 shows details of a joystick control 2010, showing a button for reverse 2012, steering controls (e.g., pushing left and/or right on 2010), throttle control on a trigger of the joystick 2018, and buttons to control the deck height (2014) and turn the mower blades on or off (2016). The control configuration in FIG. 20 also includes a display interface or informational panel 2020 along with a scroll wheel 2022 for menu navigation, buttons 2024 for headlights, etc.

Figure 21:
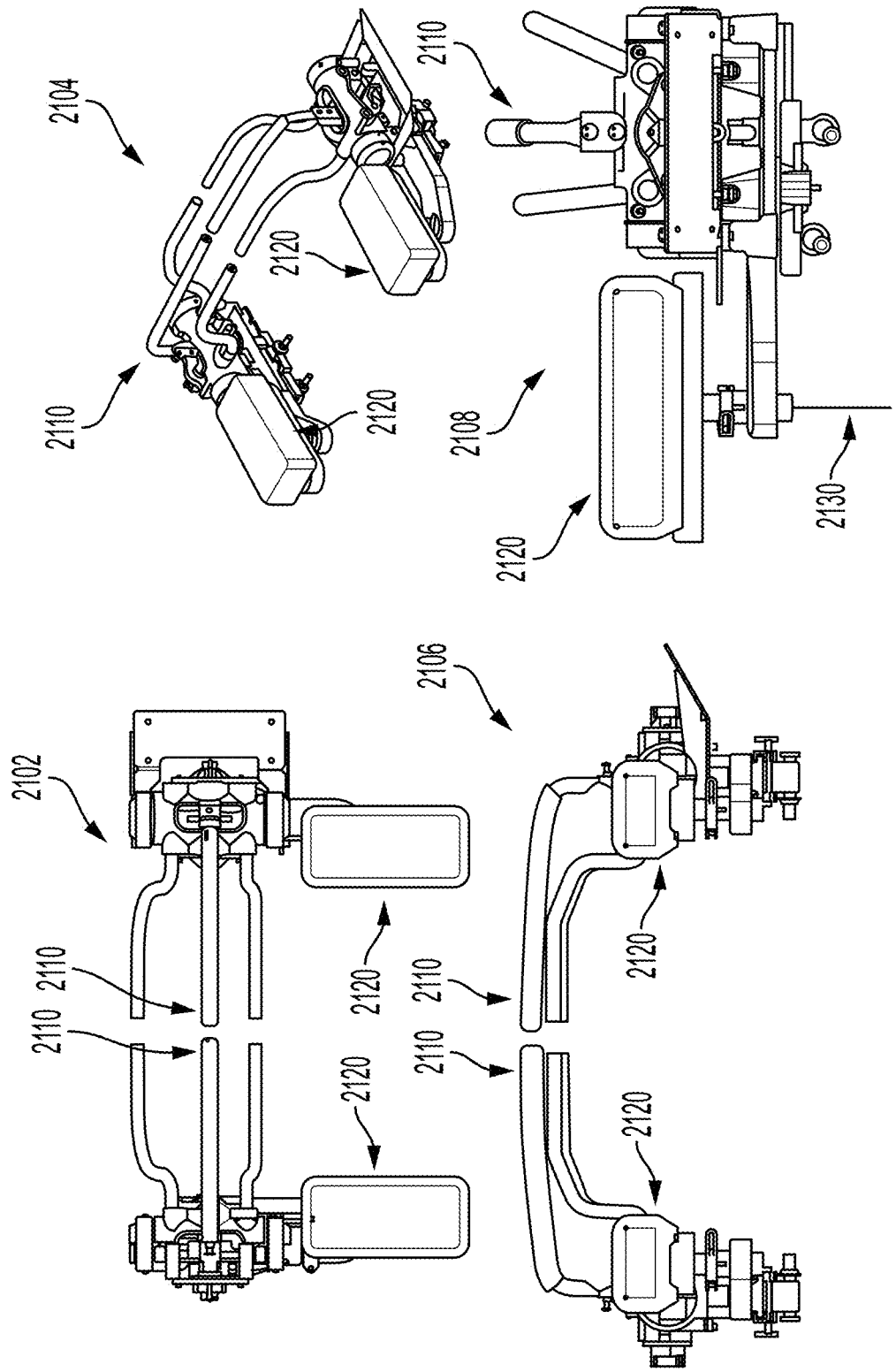
FIG. 21 illustrates four images showing different views of an example lap bar user interface that can be employed as operator controls (e.g., mower controls, etc.) in seated and/or standing operator positions, in connection with various aspects discussed herein.

Referring to FIG. 21, illustrated are four images showing different views (top view 2102, perspective view 2104, front view 2106, and side view 2108) of an example lap bar user interface 2110 that can be employed as operator controls (e.g., mower controls 104, etc.) in seated and/or standing operator positions, in connection with various aspects discussed herein. Additionally, FIG. 21 also shows adjustable armrests 2120 that can be included. In various embodiments, adjustable armrests 2120 can be rotated (e.g., about axis 2130 in FIG. 21, etc., which can move forward and/or backward with armrests 2120).

Referring to FIG. 22, illustrated are two images showing a mechanism that allows for adjustment of the position of the control pods that house lap bars 2110, in connection with various aspects discussed herein. Pull-pins 2210 can be included on each control pod housing a lap bar 2110, which can engage with one of several openings 2220 in a rail along which the control pod can slide. Pulling pull-pin 2210 out (toward the center line of the outdoor power equipment) can unlock that pull-pin 2210 from one opening 2220, allowing the associated control pod to be slid forward or backward, where the pull-pin 2210 can be re-engaged with a different opening 2220. Pull-pins 2210 can be spring-biased to remain in a locked position unless a user pulls on it to move the associated control pod.

Figure 23:
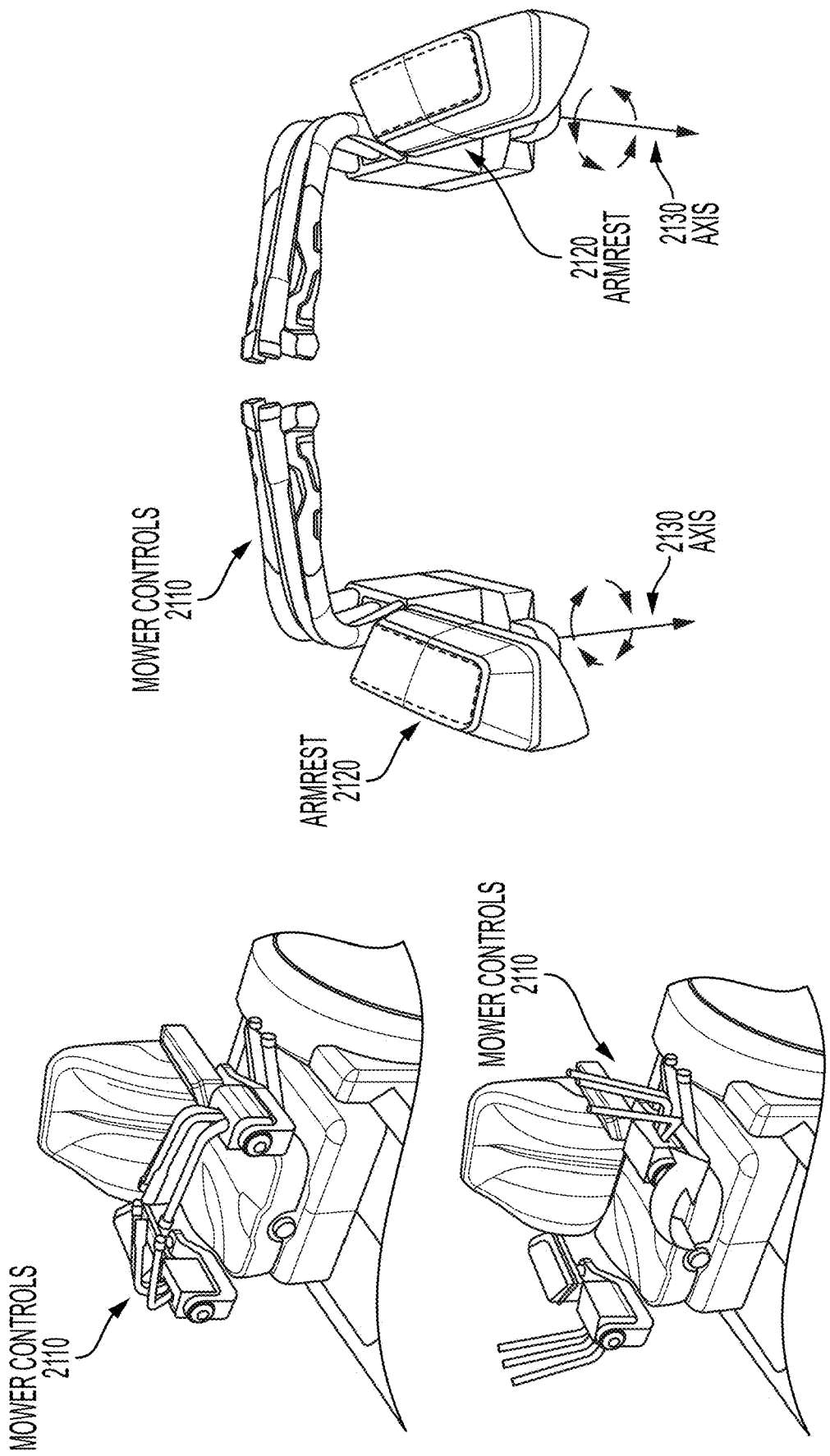
FIG. 23 illustrates three images showing rotation of mower controls and armrests, in connection with various aspects discussed herein.
Figure 24:
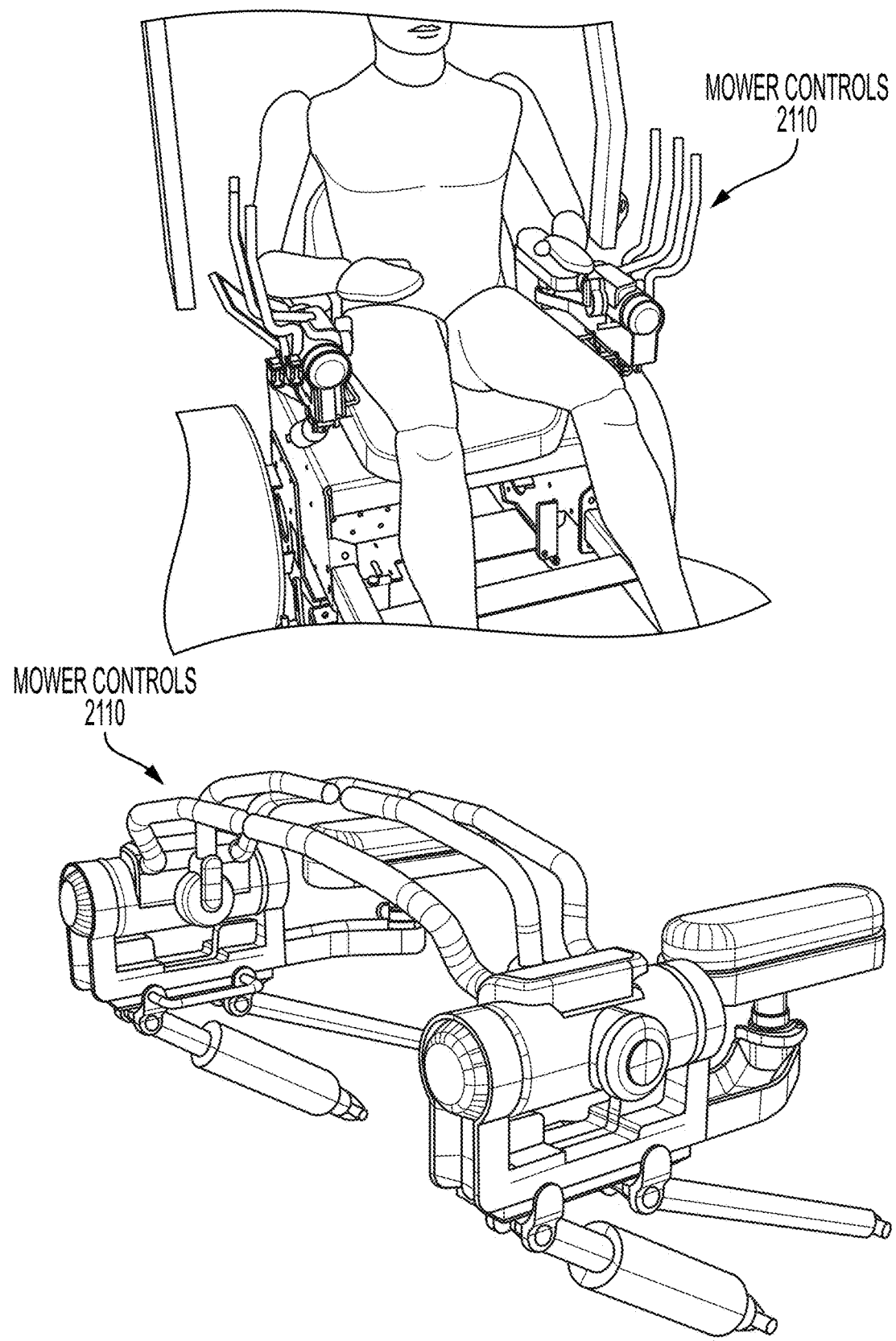
FIG. 24 illustrates two additional images showing controls in a raised position (top image) to allow operator ingress/egress and an operating position (bottom image) for controlling an outdoor power equipment, in connection with various aspects discussed herein.

Referring to FIG. 23, illustrated are three images showing rotation of mower controls 2110 and armrests 2120, in connection with various aspects discussed herein. As seen in FIG. 23, controls 2110 can be rotated upward from their control pod bases, allowing for operator ingress and/or egress from the outdoor power equipment. Additionally, FIG. 23 shows rotation of each armrest 2120 around its associated axis 2130. Referring to FIG. 24, illustrated are two additional images showing controls 2110 in a raised position (top image) to allow operator ingress/egress and an operating position (bottom image) for controlling an outdoor power equipment, in connection with various aspects discussed herein.

Figure 25:
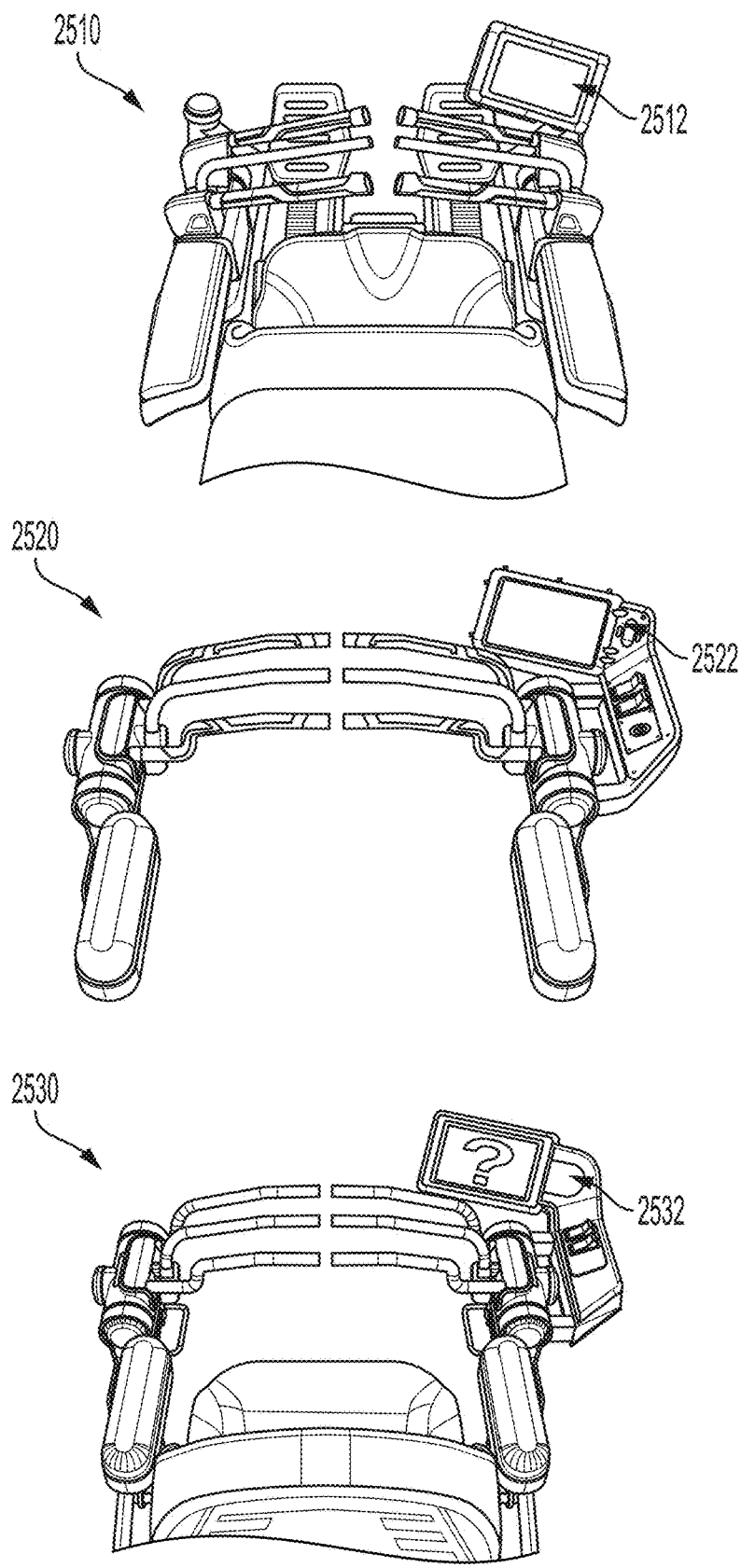
FIG. 25 illustrates three images showing different display interfaces and associated inputs that can be employed in an outdoor power equipment, in connection with various aspects discussed herein.

Referring to FIG. 25, illustrated are three images (2510, 2520, and 2530) showing different display interfaces (2512, 2522, and 2532) and associated inputs that can be employed in an outdoor power equipment, in connection with various aspects discussed herein.

Referring to FIG. 26, illustrated are left and right perspective views 2600 and 2610 of an outdoor power equipment with lap bar controls 2110, in connection with various aspects discussed herein.

Figure 27:
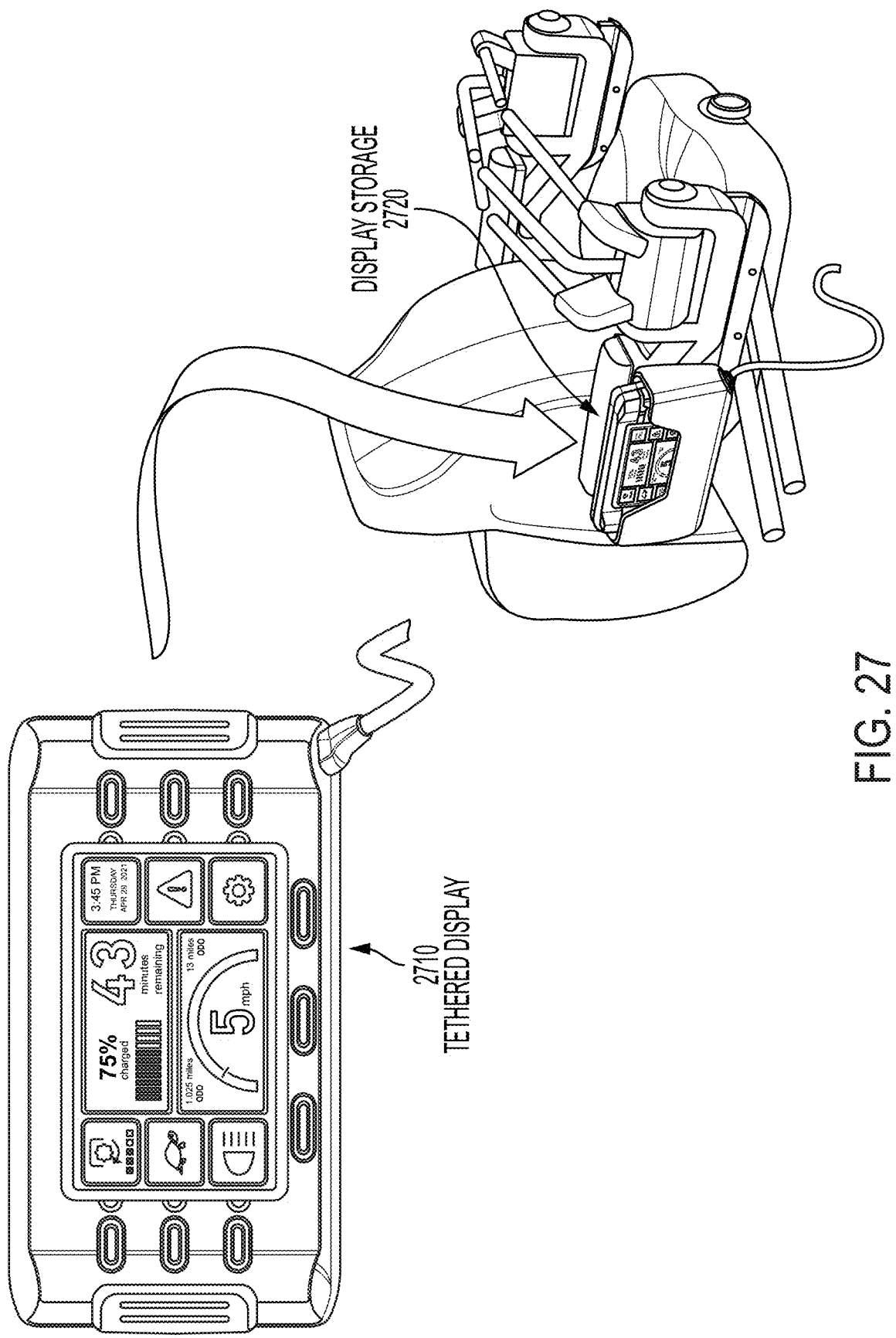
FIG. 27 illustrates images showing an example tethered display interface and associated display storage that can be employed as part of a user interface for an outdoor power equipment, in connection with various aspects discussed herein.

Referring to FIG. 27, illustrated are images showing an example tethered display interface 2710 and associated display storage 2720 that can be employed as part of a user interface for an outdoor power equipment, in connection with various aspects discussed herein.

Figure 28:
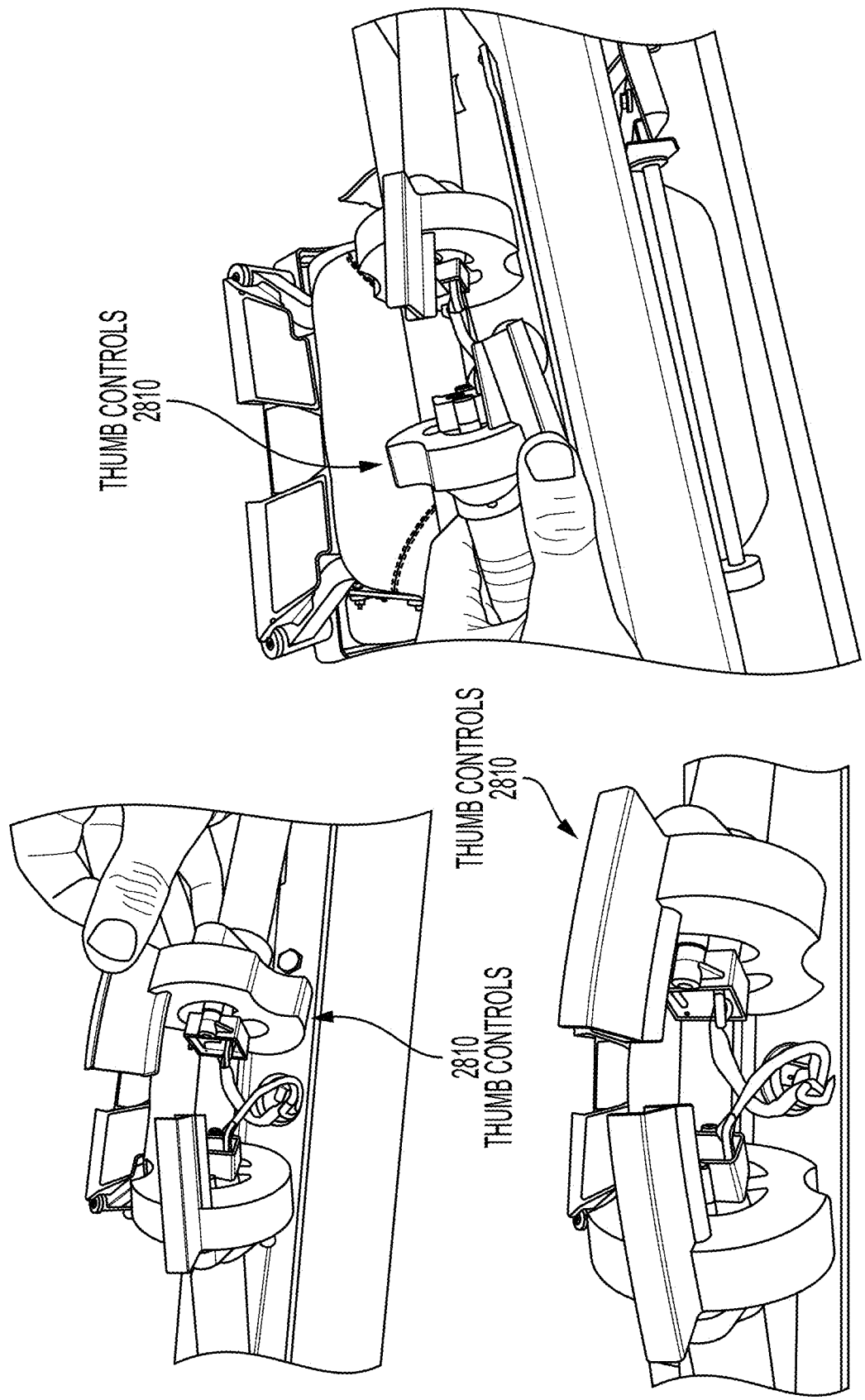
FIG. 28 illustrates images of example throttle-based thumb controls that can be employed as controls for an outdoor power equipment, in connection with various aspects discussed herein.

Referring to FIG. 28, illustrated are images of example throttle-based thumb controls 2810 that can be employed as controls for an outdoor power equipment, in connection with various aspects discussed herein. In various embodiments, a pair of thumb controls 2810 can be used to control steering and driving of an outdoor power equipment similarly to lap bars, wherein each thumb control of thumb controls 2810 can control motion of drive wheel(s)/element(s) on the corresponding side of an outdoor power equipment. Thus, for example, twisting both forward (or, alternately, backwards) an equal amount can control the outdoor power equipment to move forward (or, alternately, backwards) at a speed based on the angular displacement of the thumb controls 2810 from a neutral position, and twisting the two thumb controls 2810 to different angular displacements can cause a turn (either with or without forward or reverse motion, depending on how the average angular displacements of the two thumb controls compares to their neutral positions).

In various embodiments, any of the following control types can be employed, individually or in any combination: lap bar(s) (e.g., of standard size for a standing mower, or of smaller size, etc.), single or dual boat-style throttle control(s), steering wheel(s), joystick(s) (single axis or dual axis, wherein dual axis joystick(s) can provide acceleration and manual steering, optionally with an ability to trigger a zero-turn to the left or right by pushing the joystick all the way to the left or right, respectively, etc.), throttle(s) (e.g., including twist grip motorcycle-style throttle(s), etc.), finger and/or thumb control(s) (e.g., including multi-function thumb button(s), thumb throttle(s), finger and/or thumb control(s) on any other control type, etc.), standing control(s) that a user can control by shifting their weight (e.g., hoverboard-style control(s), etc.), a steering yoke such as in an airplane (e.g., but with forward/backward controlling speed instead of pitch, etc.), skid steer style joystick or lever controls, etc. Depending on the embodiment, controls can be on a single control arm or dual control arms. In embodiments with two control arms, they can optionally be larger, like standard size lap bars, smaller, telescoping or otherwise adjustable in size. Additionally, dual control arm embodiments can optionally have controls close enough or adjustable to become close enough together for one-handed operator control of both control arms. Additionally, control arm(s) can be adjustable such that the arm and/or optional armrest thereof can swing inward, outward, upward, and/or downward for adjustment and/or to facilitate ease of operator ingress/egress. The control arm(s) can be mounted to a frame of the outdoor power equipment and optionally rotatable and/or repositionable, or can be mounted to one or more rails, etc., that are attached to the frame, such that the control arms can slide along the rail(s), etc., for adjustment and/or between positions for seated and standing modes.

In some embodiments, the controls can be fixed to the outdoor power equipment, but in other embodiments, controls can be detachable, with optionally two or more potential controls that can be attached. In such embodiments, quick connect connectors can be used so that an operator can readily replace controls.

Independent of the specific controls that are employed, various embodiments can optionally allow for tilting or position of controls for ideal positioning for a given user (e.g., allowing for change in angle, movement up or down, movement forward or backward, movement left or right, including (when there are two or more controls) the ability to position controls together or apart, centered or off to either side, etc.). In embodiments comprising an optional display interface, the display can be movable with the controls (e.g., between standing and seated positions and/or additional adjustment within the seated and/or standing positions, etc.). Optionally, control positioning can be saved or remembered by the outdoor power equipment, for example, saving one or more control positions for each operator (e.g., one or more seated and/or standing positions for the operator(s), etc.), saving one or more control positions for each of the seated and/or standing positions, etc.

Additionally, deck engagement controls for the lawn maintenance apparatus optionally can move with the other controls, and deck engagement controls can employ any of a variety of control means discussed herein (e.g., mechanical, electromechanical, pneumatic, hydraulic, etc.).

Figure 30:
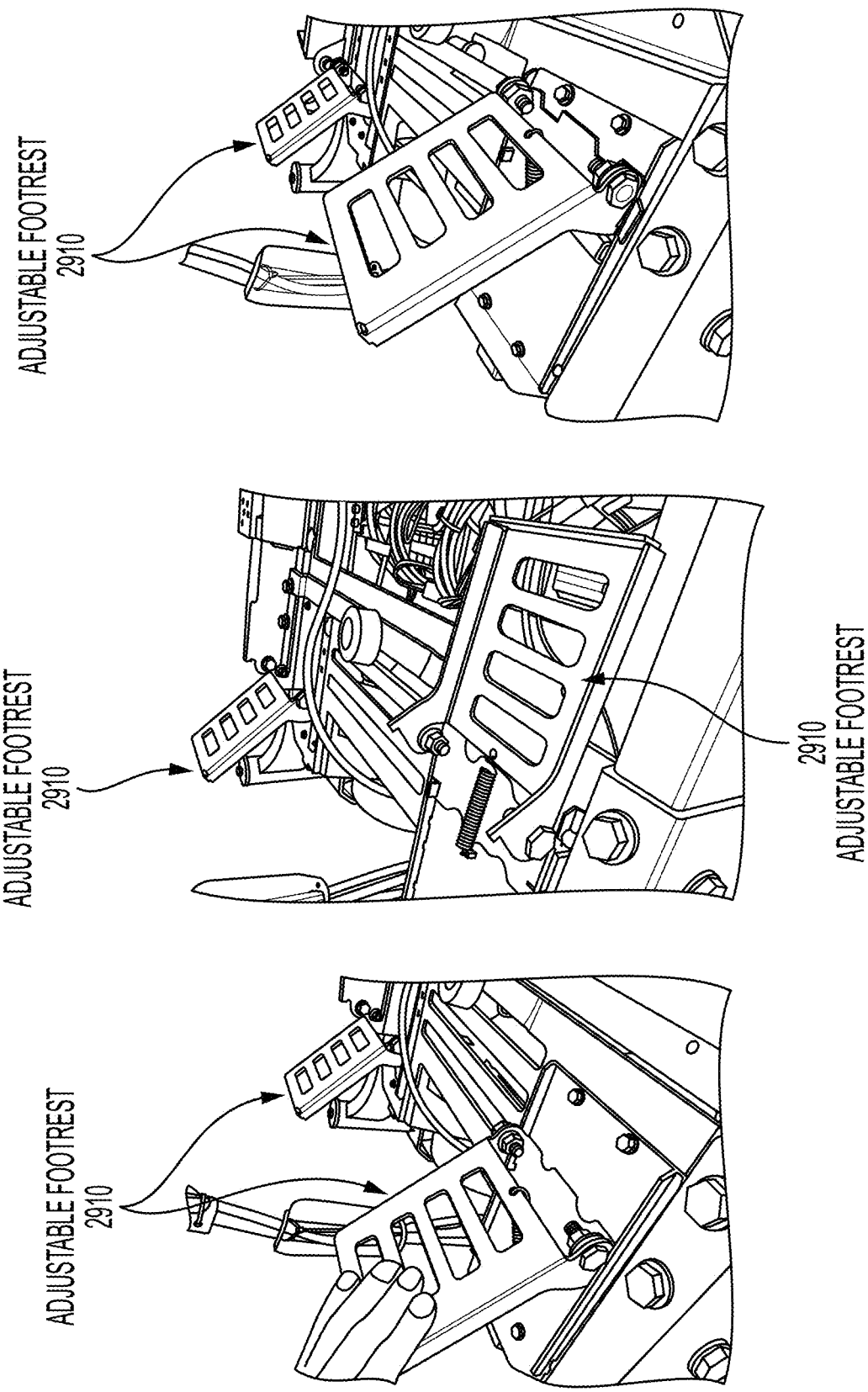
FIG. 30 illustrates three images showing repositioning of an adjustable footrest that can be employed on an outdoor power equipment, in connection with various aspects discussed herein.

Referring to FIG. 29, illustrated are a pair of images showing an example adjustable footrest 2910 that can be employed on an outdoor power equipment, in connection with various aspects discussed herein. Referring to FIG. 30, illustrated are three images showing repositioning of an adjustable footrest 2910 that can be employed on an outdoor power equipment, in connection with various aspects discussed herein. In various embodiments, adjustable footrest 2910 can be on a platform that can slide along a track to adjust the position of adjustable footrest 2910. When adjustable footrest 2910 is in an upright position (e.g., in both images of FIG. 29 or the left and right images of FIG. 30, etc.), it can be locked into place (e.g., via the tabs seen on the ends of adjustable footrest 2910 in the middle image of FIG. 30 engaging with corresponding openings on the track, etc.) to prevent unintentional movement. To adjust the position of adjustable footrest 2910, it can be folded back (e.g., toward the operator seat) to unlock it (e.g., as seen in the middle image of FIG. 30), moved to a new position, and then relocked at the new position.

Figure 31:
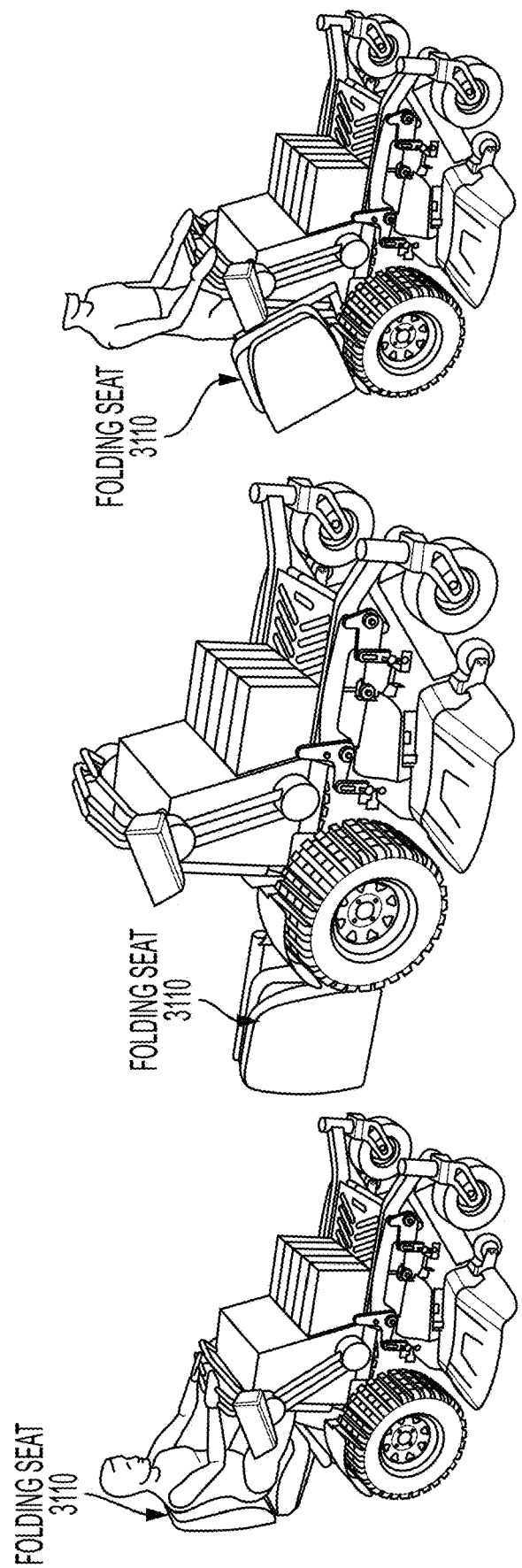
FIG. 31 illustrate three images showing a folding seat converting between a seated operating position (left image) to a standing operating position (right image), in connection with various aspects discussed herein.

Referring to FIG. 31, illustrated are three images showing a folding seat 3110 converting between a seated operating position (left) to a standing operating position (right), in connection with various aspects discussed herein. In various embodiments, a folding seat such as folding seat 3110 can be employed to allow both seated and standing operating positions on an outdoor power equipment. The left image of FIG. 31 shows the folding seat 3110 in a first position for seated operation. The right image of FIG. 31 shows the folding seat 3110 in a second position for standing operation. The middle image of FIG. 31 shows the folding seat 3110 in an intermediate position between the first and second positions. Transition from the first position to the second position can be accomplished by folding down the seat back, folding the seat back and base into a vertical orientation, rotating the seat back and seat base out of the operator area to a position shown in the middle image of FIG. 31, and then into a stowed position (e.g., the second position for standing operation). In the embodiment shown in FIG. 31, the folding and rotating can be accomplished in any order or simultaneously.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An outdoor power equipment, comprising:
a frame;
a plurality of drive wheels rotatable about a drive wheel rotation axis;
a rollover protection (ROP) bar secured to the frame;
an operator seat secured to the frame;
a cushion configured to be in one or more of a first position associated with a sitting configuration of the outdoor power equipment or a second position associated with a standing configuration of the outdoor power equipment;
drive controls for operator-initiated drive and steering functions of the outdoor power equipment; and
a standing platform positioned at least in part rearward of the operator seat, wherein at least two of the ROP bar, the cushion, or the drive controls are configured to move together between the sitting configuration and the standing configuration of the outdoor power equipment.

2. The outdoor power equipment of claim 1, wherein the ROP bar and the cushion are configured to move together between the sitting configuration and the standing configuration of the outdoor power equipment.

3. The outdoor power equipment of claim 1, wherein the ROP bar and the drive controls are configured to move together between the sitting configuration and the standing configuration of the outdoor power equipment.

4. The outdoor power equipment of claim 1, wherein the drive controls and the cushion are configured to move together between the sitting configuration and the standing configuration of the outdoor power equipment.

5. The outdoor power equipment of claim 1, wherein the ROP bar, the cushion, and the drive controls are configured to move together between the sitting configuration and the standing configuration of the outdoor power equipment.

6. An outdoor power equipment, comprising:
a frame;
a plurality of drive wheels rotatable about a drive wheel rotation axis;
an operator seat secured to the frame;
a movable cushion configured to be alternately in a first position associated with a sitting configuration of the outdoor power equipment and a second position associated with a standing configuration of the outdoor power equipment, wherein the movable cushion is configured to be a seat back in the first position;
drive controls for operator-initiated drive and steering functions of the outdoor power equipment; and
a standing platform positioned at least in part rearward of the operator seat.

7. The outdoor power equipment of claim 6, wherein the movable cushion is configured to slide along a track to move between the first position and the second position.

8. The outdoor power equipment of claim 6, wherein the movable cushion is configured to rotate around an axis to move between the first position and the second position.

9. The outdoor power equipment of claim 6, wherein the movable cushion is configured to removably couple to a first one or more mounts associated with the first position and to removably couple to a second one or more mounts associated with the second position.

10. The outdoor power equipment of claim 6, wherein at least one of the first position or the second position is configured to be adjusted.

11. The outdoor power equipment of claim 6, wherein the movable cushion is configured to be a hip pad in the second position.

* * * * *